(12) United States Patent
Ogishi et al.

(10) Patent No.: US 10,549,468 B2
(45) Date of Patent: Feb. 4, 2020

(54) SPINNING FORMING METHOD AND SPINNING FORMING APPARATUS

(71) Applicant: KAWASAKI JUKOGYO KABUSHIKI KAISHA, Kobe-shi, Hyogo (JP)

(72) Inventors: Hideyuki Ogishi, Akashi (JP); Hayato Iwasaki, Kobe (JP); Yoshihide Imamura, Kobe (JP); Yuto Sakane, Kobe (JP); Toshiro Tsuji, Kakogawa (JP); Hiroshi Kitano, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 376 days.

(21) Appl. No.: 14/424,725

(22) PCT Filed: Aug. 30, 2013

(86) PCT No.: PCT/JP2013/005147
§ 371 (c)(1),
(2) Date: Feb. 27, 2015

(87) PCT Pub. No.: WO2014/034140
PCT Pub. Date: Mar. 6, 2014

(65) Prior Publication Data
US 2015/0209991 A1    Jul. 30, 2015

(30) Foreign Application Priority Data

Sep. 3, 2012 (JP) ................................. 2012-193321

(51) Int. Cl.
*B21D 22/14* (2006.01)
*B29C 48/05* (2019.01)
(Continued)

(52) U.S. Cl.
CPC .............. *B29C 48/05* (2019.02); *B21D 22/14* (2013.01); *B21D 22/16* (2013.01); *B21D 22/18* (2013.01);
(Continued)

(58) Field of Classification Search
CPC ........ B21D 22/14; B21D 22/16; B21D 22/18; B21D 22/185
See application file for complete search history.

(56) References Cited

U.S. PATENT DOCUMENTS 3,815,395 A * 6/1974 Sass ........................ B21D 22/18
                                                            72/342.1
5,598,729 A * 2/1997 Hoffmann ............... B21D 22/18
                                                              72/10.4
(Continued)

FOREIGN PATENT DOCUMENTS

| CN | 1228751 A | 9/1999 |
| EP | 0081700 A1 | 6/1983 |

(Continued)

OTHER PUBLICATIONS

Halmos, George T., Roll Forming Handbook, 2005, CRC Press, (p. 6-10, last paragraph).*

(Continued)

*Primary Examiner* — William P Bell
*Assistant Examiner* — Andrew L Swanson
(74) *Attorney, Agent, or Firm* — Oliff PLC

(57) ABSTRACT

A spinning forming method includes a first forming step and a second forming step, in each of which a plate fixed to a main shaft is formed while being rotated. In the first forming step, a processing tool is brought into contact with a first main surface of the plate to form a first level-changing portion extending from the first main surface toward a second main surface. In the second forming step, the pro- (Continued)

cessing tool is brought into contact with the second main surface at an outer peripheral side of the first level-changing portion to form a second level-changing portion extending in an opposite direction to the first level-changing portion.

10 Claims, 16 Drawing Sheets

(51) Int. Cl.
    *B21D 22/18*     (2006.01)
    *B21D 37/16*     (2006.01)
    *B21D 22/16*     (2006.01)
    *B29L 31/00*     (2006.01)

(52) U.S. Cl.
    CPC ........ *B21D 37/16* (2013.01); *B29L 2031/731* (2013.01)

(56) References Cited

U.S. PATENT DOCUMENTS

| | | | |
|---|---|---|---|
| 5,743,157 A | 4/1998 | Hinze | |
| 7,121,128 B2 * | 10/2006 | Kato | B21D 22/16 72/68 |
| 2004/0089043 A1 * | 5/2004 | Meinig | B21D 19/046 72/86 |
| 2004/0226333 A1 | 11/2004 | Kato et al. | |

FOREIGN PATENT DOCUMENTS

| | | | |
|---|---|---|---|
| EP | 1481744 A1 * | 12/2004 | ........... B21D 22/185 |
| JP | S53-82654 A | 7/1978 | |
| JP | 2001-286940 A | 10/2001 | |
| JP | 2004-337906 A | 12/2004 | |
| JP | 2008-080359 A | 4/2008 | |
| JP | 2011-218427 A | 11/2011 | |

OTHER PUBLICATIONS

Kaszian, How to Make a Cake Pan(Metal Spinning), May 27, 2012, Youtube, https://www.youtube.com/watch?v=rSkOO9I_D4I (Year: 2012).*
Shi, A theoretical Study of the Ironing Process in Sheet Metal Forming, 1989, Springer, Journal of Materials Shaping Technology vol. 2 No. 4, 203-204 (Year: 1989).*
Nov. 19, 2013 International Search Report issued in International Patent Application No. PCT/JP2013/005147.
Oct. 9, 2015 Office Action issued in Chinese Patent Application No. 201380045623.4.
Aug. 7, 2017 3rd party Observations in European Patent Application No. 13833451.1.
Dec. 8, 2017 Office Action issued in European Patent Application No. 13833451.1.

\* cited by examiner

SPINNING FORMING METHOD AND SPINNING FORMING APPARATUS

TECHNICAL FIELD

The present invention relates to a spinning forming method and a spinning forming apparatus.

BACKGROUND ART

In many cases, a spinning forming method that is one type of plasticity processing uses a mandrel (shaping die) attached to a main shaft for rotating a plate that is a formation target. For example, as disclosed in PTL 1, the plate is placed on the mandrel attached to the main shaft, and a tail stock presses a surface of the plate, the surface being opposite to a surface contacted by the mandrel. Thus, the plate is fixed to the mandrel. In this state, the plate is rotated by the rotation of the main shaft, and a processing tool, such as a processing roller, is brought into contact with the surface of the plate. Thus, the plate is formed.

CITATION LIST

Patent Literature

PTL 1: Japanese Laid-Open Patent Application Publication No. 2011-218427

SUMMARY OF INVENTION

Technical Problem

In the spinning forming method using the mandrel, the plate is generally pressed against a side surface of the mandrel by the processing tool. For example, in a case where the cross-sectional shape of the mandrel is a trapezoidal shape, depressions or projections extending, in a circumferential direction of the mandrel are formed on the side surface spreading in a tapered shape downward from a top surface, which receives the plate, of the mandrel. With this, depressions and projections lined up in a direction along a rotational axis of the main shaft can be formed on the plate. However, in a case where the mandrel is used, the plate is pressed against the side surface of the mandrel, so that it is difficult to form on the plate the depressions and projections lined up in a radial direction of the main shaft. In addition, in a case where the plate is formed to have depressions and projections by a conventional spinning forming method, it is necessary to prepare a delicate mandrel having projections and depressions corresponding to the depressions and projections to be formed on the plate. Therefore, problems are that a manufacturing cost of the mandrel is required for every shape to be formed, and therefore, a formation cost of the plate increases.

The present invention was made to solve the above problems, and an object of the present invention is to form a plate such that the plate has arbitrary depressions and projections.

Solution to Problem

To achieve the above object, a spinning forming method according to one aspect of the present invention includes: a first forming step of forming a first level-changing portion by, while rotating a plate fixed to a main shaft, causing a processing tool to contact a first main surface of the plate, the first level-changing portion extending from the first main surface toward a second main surface opposite to the first main surface; and a second forming step of forming a second level-changing portion by, while rotating the plate fixed to the main shaft, causing the processing tool to contact the second main surface of the plate at an outer peripheral side of the first level-changing portion, the second level-changing portion extending in an opposite direction to the first level-changing portion.

According to the spinning forming method, by causing the processing tool to contact the first main surface and second main surface of the plate, the first level-changing portion and the second level-changing portion extending in the opposite direction to the first level-changing portion are sequentially formed. By such two-step spinning forming, the depressions and projections can be formed on the plate without using a mandrel (shaping die), and the direction in which the depressions and projections are lined up can be set freely. Therefore, the plate can be formed to have arbitrary depressions and projections.

The spinning forming method may include: a preparing step before the first forming step; and an intermediate step after the first forming step and before the second forming step. The preparing step may be such that the plate is placed on a first receiving jig attached to the main shaft, and the plate is fixed to the main shaft via the first receiving jig by a fixing jig. The intermediate step may be such that the first receiving jig is replaced with a second receiving jig larger than the first receiving jig and including an annular protruding portion that supports a bottom portion of the first level-changing portion, the plate turned over is then placed on the second receiving jig, and the plate is fixed to the main shaft via the second receiving jig by the fixing jig.

According to the above configuration, each of the first level-changing portion and the second level-changing portion can be formed by causing the processing tool to contact the main surface, where the fixing member is provided, of the plate. Therefore, the operation of positioning the processing tool can be simplified.

The spinning forming method may be such that an edge portion that is pointed toward a predetermined radial position of the bottom portion of the first level-changing portion is formed at a tip end of the protruding portion of the second receiving jig.

In a case where the tip end of the protruding portion is flat, the position of a reaction force working point that restrains the bottom portion of the first level-changing portion may change within a range of the width of the protruding portion at the time of the formation. However, in a case where the edge portion is formed at the tip end of the protruding portion, the position of the reaction force working point can be made constant in a radial direction over the entire periphery. With this, the deformation amount of the plate at the time of the formation can be stabilized in the circumferential direction.

The spinning forming method may be such that in the second forming step, the processing tool is brought into contact with the second main surface of the plate in the vicinity of the edge portion of the second receiving jig.

According to the above configuration, when forming the second level-changing portion, the radial position of the plate contacted by the processing tool and the predetermined radial position of the plate supported by the edge portion of the second receiving jig are brought close to each other. With this, the plate is started to be bent from the predetermined radial position supported by the edge portion. Thus, it is possible to reduce the deflection of the plate at a radially inner side of a formation start position of the second level-changing portion.

The spinning forming method may include: a preparing step before the first forming step; and an intermediate step after the first forming step and before the second forming step. The preparing step may be such that the plate is placed on a first receiving jig attached to the main shaft, and the plate is fixed to the main shaft via the first receiving jig by a first fixing jig. The intermediate step may be such that the first receiving jig is replaced with a second receiving jig larger than the first receiving jig and including an annular protruding portion that supports a bottom portion of the first level-changing portion, the plate turned over is then placed on the second receiving jig, and the plate is fixed to the main shaft via the second receiving jig by a second fixing jig having a size that is not smaller than a minimum diameter of a portion where the protruding portion of the second receiving jig contacts the plate.

According to the above configuration, each of the first level-changing portion and the second level-changing portion can be formed by causing the processing tool to contact the main surface, where the fixing member is provided, of the plate. Therefore, the operation of positioning the processing tool can be simplified. In addition, when forming the second level-changing portion, the bottom portion of the first level-changing portion is supported so as to be sandwiched between the annular protruding portion of the second receiving jig and the peripheral portion of the second fixing jig. With this, the pressing force applied to the plate at a position where the plate is sandwiched can be increased. Thus, the formation can be realized more stably.

The spinning forming method may be such that when the plate turned over is placed on the second receiving jig, only the protruding portion of the second receiving jig receives the first main surface of the plate.

The above configuration is advantageous in that the formation can be performed even in a case where the first level-changing portion is smaller in height than the protruding portion.

The first forming step may be such that a heater provided at an opposite side of the processing tool across the plate locally heats a position of the second main surface of the plate, the position being located on a circumference defined by a position, with which the processing tool contacts, of the plate. The second forming step may be such that the heater provided at the opposite side of the processing tool across the plate locally heats a position of the first main surface of the plate, the position being located on the circumference defined by the position, with which the processing tool contacts, of the plate.

According to the above configuration, since the mandrel is not used, the formation target portion of the plate can be locally heated from a side opposite to a side where the processing tool is provided, and the occurrence of phenomena, such as cracks and deformations, caused when heating the entire plate can be suppressed. Further, since the mandrel is not used, the heat from the heater is not deprived by the mandrel. Therefore, the local heating of the formation target portion of the plate can be efficiently performed.

The spinning forming method may be such that multistage forming of the plate is realized by repeatedly performing the first forming step and the second forming step.

According to the above configuration, by multistage spinning forming in which the first level-changing portion and the second level-changing portion are sequentially, repeatedly formed, the plate can be formed to have more complex depressions and projections.

To achieve the above object, a spinning forming apparatus according to another aspect of the present invention includes: a main shaft configured to rotate a plate that is a formation target; a first receiving jig attached to the main shaft and including a circular first receiving surface that receives a second main surface of the plate opposite to a first main surface of the plate; a second receiving jig attached to the main shaft instead of the first receiving jig and including a circular second receiving surface larger in diameter than the first receiving surface and an annular protruding portion formed at a peripheral portion of the second receiving surface and receiving the first main surface of the plate; a fixing jig provided so as to face the first receiving surface or the second receiving surface across the plate and configured to fix the plate to the main shaft via the first receiving jig or the second receiving jig; and a processing tool configured to contact the first main surface of the plate provided on the first receiving jig to form a first level-changing portion not larger in height than the protruding portion of the second receiving jig and contact the second main surface of the plate, which is placed on the second receiving jig in a turned-over state, at an outer peripheral side of the first level-changing portion to form a second level-changing portion extending in an opposite direction to the first level-changing portion.

According to the above configuration, by causing the processing tool to contact the first main surface and second main surface of the plate, the first level-changing portion and the second level-changing portion extending in the opposite direction to the first level-changing portion are sequentially formed. By such two-step spinning forming, the depressions and projections can be formed on the plate without using a mandrel (shaping die), and the direction in which the depressions and projections are lined up can be set freely. Therefore, the plate can be formed to have arbitrary depressions and projections. In addition, according to the above configuration, when forming the second level-changing portion, the plate is turned over, and the turned-over plate is then received by the second receiving jig. With this, each of the first level-changing portion and the second level-changing portion can be formed by causing the processing tool to contact the main surface, where the fixing member is provided, of the plate. Thus, the operation of positioning the processing tool can be simplified.

The spinning forming apparatus may be such that an edge portion that is pointed toward a predetermined radial position of a bottom portion of the first level-changing portion is formed at a tip end of the protruding portion of the second receiving jig.

In a case where the tip end of the protruding portion is flat, the position a reaction force working point that restrains the bottom portion of the first level-changing portion may change within a range of the width of the protruding portion at the time of the formation. However, in a case where the edge portion is formed at the tip end of the protruding portion, the position of the reaction force working point can be made constant in the radial direction over the entire periphery. With this, the stable formation can be realized.

The spinning forming apparatus may be configured such that when forming the second level-changing portion, the processing tool is brought into contact with the second main surface of the plate in the vicinity of the edge portion of the second receiving jig.

According to the above configuration, when forming the second level-changing portion, the radial position of the plate contacted by the processing tool and the predetermined radial position of the plate supported by the edge portion of the second receiving jig are brought close to each other. With this, the plate is started to be bent from the predetermined radial position supported by the edge portion. Thus, it is possible to reduce the deflection of the plate at a radially inner side of the formation start position of the second level-changing portion.

The spinning forming apparatus may include as the fixing jig: a first fixing jig used to form the first level-changing portion; and a second fixing jig used to form the second level-changing portion and having a size that is not smaller than a minimum diameter of a portion where the protruding portion of the second receiving jig contacts the plate.

According to the above configuration, when forming the second level-changing portion, the bottom portion of the first level-changing portion is supported so as to be sandwiched between the annular protruding portion of the second receiving jig and the peripheral portion of the second fixing jig. With this, the pressing force applied from the processing tool to the plate can be increased. Thus, the formation can be realized more stably.

The spinning forming apparatus may include a heater provided at an opposite side of the processing tool across the plate and configured to locally heat a position of the first main surface or second main surface of the plate, the position being located on a circumference defined by a position, with which the processing tool contacts, of the plate.

According to the above configuration, since the mandrel is not used, the formation target portion of the plate can be locally heated from a side opposite to a side where the processing tool is provided, and the occurrence of phenomena, such as cracks and deformations, caused when heating the entire plate can be suppressed. Further, since the mandrel is not used, the heat from the heater is not deprived by the mandrel. Therefore, the local heating of the formation target portion of the plate can be efficiently performed.

Advantageous Effects of Invention

According to the present invention, the plate can be formed to have arbitrary depressions and projections without using a mandrel (shaping die).

DESCRIPTION OF EMBODIMENTS

Hereinafter, preferred embodiments of the present invention will be explained in reference to the drawings. In the following explanations and drawings, the same reference signs are used for the same or corresponding components, and a repetition of the same explanation is avoided. Unless otherwise specified, the terms "inner" and "outer" respectively denote inner and outer relative to a rotational axis O in a radial direction around the rotational axis O.

Embodiment 1

Configuration Example of Spinning Forming Apparatus

Figure 1:
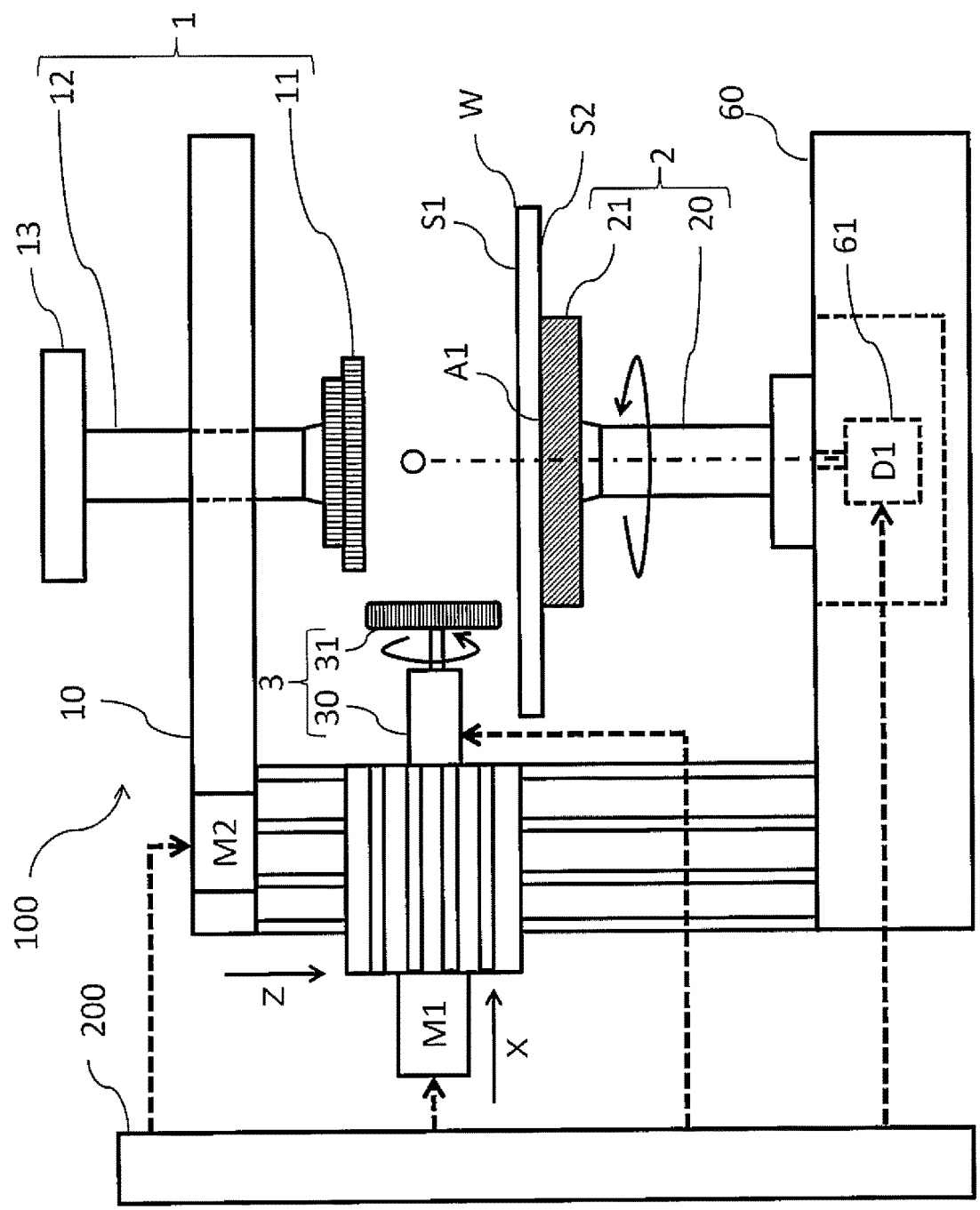
FIG. 1 is a diagram showing a configuration example of a spinning forming apparatus according to Embodiment 1 of the present invention.

FIG. 1 is a diagram showing a configuration example of a spinning forming apparatus according to Embodiment 1 of the present invention.

A spinning forming apparatus 100 shown in FIG. 1 mainly includes: a base 60 including a main shaft box 61 which is a space including an upper opening portion formed at a substantially middle portion of the base 60 and in which a motor D1 for driving a below-described main shaft 20 is accommodated; and a rotating member 2 configured to receive a plate W, to be formed, to rotate together with the plate W; a fixing member 1 configured to fix the plate W, arranged on the rotating member 2, by contacting a main surface of the plate W so as to face the rotating member 2; a processing tool 3 configured to contact the main surface of the plate W to process the plate W; and a control device 200. In the present embodiment, the main shaft 20 extends in a vertical direction. However, the main shaft 20 may extend in a horizontal direction or an oblique direction.

The plate W is a work (formation target object) that is a material of a formed product having arbitrary depressions and projections and is a flat plate having a circular axially symmetric shape and a uniform thickness. To be specific, the plate W includes a first main surface S1 and a second main surface S2 parallel to each other. In the present embodiment, the plate W is attached to the spinning forming apparatus 100 in a state where the first main surface S1 is located at a side where the fixing member 1 is provided, and the second main surface S2 is located at a side where the rotating member 2 is provided. In other words, the first main surface S1 of the plate W is an upper surface, and the second main surface S2 of the plate W is a lower surface. The arrangement of the plate W may be reversed (i.e., the first main surface S1 and the second main surface S2 may be respectively the lower surface and the upper surface).

It should be noted that the plate W is not limited to a flat plate having a uniform thickness, and the plate W in the present specification is not limited to a flat plate. For example, the plate W may be: a plate, at least a part of which has a curved surface; or a plate that is bent in advance (i.e., a material in the middle of formation or a material after formation). In addition, the plate W may be a material, a part of which is different in thickness from the other part, such as a plate to which another plate is partially attached or a plate integrated with another plate by casting. Further, the plate W may be: a plate, at least a part of which has a surface curved in a thickness direction; or a plate that is bent in advance. Furthermore, the plate W may be a plate, a part of which is different in thickness from the other part, and one example is a member formed by coaxially stacking a small-diameter circular plate-shaped member (such as a frustum-shaped member) on a large-diameter circular plate-shaped member. The shape of the plate W in plan view is not limited to a circular shape and may be an axially asymmetric shape (such as an eccentric axis shape), a square shape, or an oval shape.

The rotating member 2 includes: the main shaft 20 attached so as to be coaxial with a rotational axis of the motor D1; and a receiving jig 21 attached to an upper end portion of the main shaft 20 so as to be replaceable and supporting the plate W. The receiving jig 21 includes a circular receiving surface A1 substantially perpendicular to the rotational axis O of the main shaft 20. The receiving surface A1 contacts the second main surface S2, opposite to the first main surface S1 of the plate W, to receive the second main surface S2. The receiving jig 21 shown in FIG. 1 is a jig for a below-described first level-changing portion 41 (see FIG. 3) and is a column having a uniform thickness. However, the thickness of the receiving jig 21 may be nonuniform as long as the receiving surface A1 that receives the main surface S2 of the plate W is flat. Further, the receiving surface A1 is not necessarily flat as long as the receiving surface A1 can stably support the plate W from below, and an outer peripheral portion thereof has a circular shape. For example, a projection that is annular around the rotational axis O may be formed on the receiving surface A1.

The fixing member 1 is provided at a frame 10 located above the rotating member 2 and includes a tailstock shaft 12 and a fixing jig 11. The tailstock shaft 12 is provided at a predetermined position of the frame 10, and a central axis thereof extends in a direction of extension of the rotational axis O of the main shaft 20. The tailstock shaft 12 is slidable in a direction (z-axis direction) along the central axis by a force of a pressurizing unit 13, such as a hydraulic actuator, provided at a predetermined position of the frame 10. The fixing jig 11 fixes the plate W to the main shaft 20 via the receiving jig 21. Specifically, the fixing jig 11 is attached to a lower end portion of the tailstock shaft 12 via a rotatable member, such as a bearing, so as to be rotatable and replaceable. The fixing jig 11 is provided so as to face the receiving surface A1 of the receiving jig 21. The fixing jig 11 contacts the first main surface S1 of the plate W, placed on the receiving jig 21, to clamp the plate W rotatably around the rotational axis O.

For example, the fixing jig 11 is a circular plate having the same diameter as the receiving member 21. However, the fixing jig 11 may be larger or smaller than the receiving member 21. In addition, the shape of the fixing jig 11 in plan view is not limited to a circular shape and may be a polygonal shape.

The processing tool 3 includes: a processing roller 31 configured to contact the plate W to form the plate W in a desired shape; and a forming machine 30. The forming machine 30 includes: an x-axis motor M1 configured to slide the processing roller 31 in an x-axis direction (direction perpendicular to the rotational axis O of the main shaft 20); and a z-axis motor M2 configured to slide the processing roller 31 in the z-axis direction (direction parallel to the rotational axis O of the main shaft 20). The number of processing tools 3 may be one or plural. Further, the configuration is not limited to the processing roller 31, and for example, a processing tool including a spatula may be used.

The control device 200 executes a forming program to form the plate W by numerical control. The forming program defines details and procedure of a below-described spinning forming method. Specifically, x-axis and z-axis positional information and speed information are fed back to the control device 200 from position detectors, such as encoders, respectively included in the x-axis motor M1 and the z-axis motor M2. With this, the control device 200 executes servo control of the x-axis motor M1 and the z-axis motor M2, such as positioning and speed control. Further, the control device 200 drives the motor D1 by outputting rotation commands, which respectively define rotation start, rotation end, and rotation speed, to the motor D1 for driving the main shaft 20. It should be noted that the control device 200 may execute the servo control of the motor D1 as with the x-axis motor M1 and the z-axis motor M2. The control device 200 is configured as a numerical control device including at least: a memory which stores the forming program; and a CPU which executes the forming program stored in the memory. The control device 200 may have a centralized configuration realized by a single CPU or a distributed configuration realized by a plurality of CPUs.

One Example of Spinning Forming Method

Figure 2:
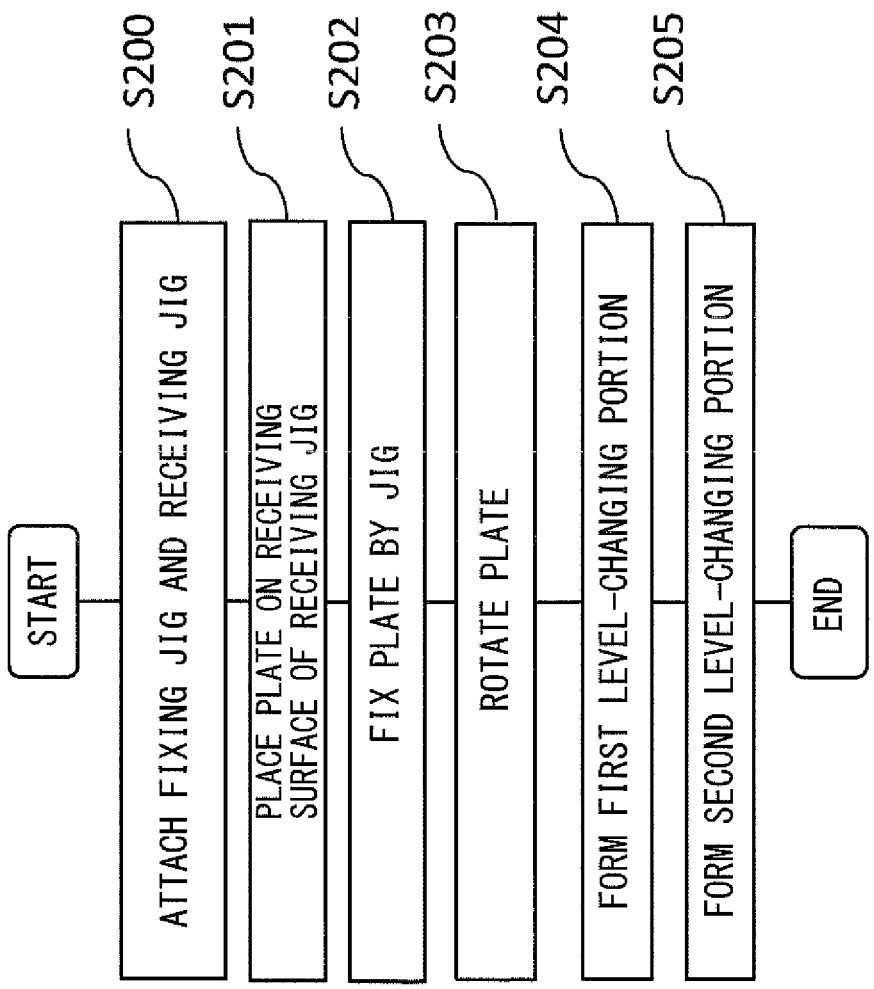
FIG. 2 is a flow chart showing one example of a spinning forming method performed by the spinning forming apparatus according to Embodiment 1 of the present invention.

FIG. 2 is a flow chart showing one example of the spinning forming method according to Embodiment 1 of the present invention. The spinning forming method of the present embodiment includes a preparing step, a first forming step, and a second forming step.

Preparing Step

First, the fixing jig 11 is attached to a tip end portion of the tailstock shaft 12 of the fixing member 1, and the receiving jig 21 is attached to a tip end portion of the main shaft 20 of the rotating member 2 (Step S200). Then, the plate W to be formed is placed on the receiving jig 21 such that the receiving surface A1 of the receiving jig 21 receives the second main surface S2 of the plate W (Step S201). These operations may be automatically executed by an industrial robot (not shown) or may be manually performed by an operator.

Next, the fixing jig 11 is provided so as to face the receiving surface A1 of the receiving jig 21, and the fixing jig 11 is pressed against the main surface S1 of the plate W placed on the receiving surface A1 of the receiving jig 21. Thus, the plate W is sandwiched between the fixing jig 11 and the receiving jig 21 to be clamped (Step S202). To be specific, the plate W is fixed to the main shaft 20 via the receiving jig 21 by the fixing jig 11. It should be noted that these operations are manually performed by an operator but may be automatically executed by the control device 200.

First Forming Step

In the first forming step, while rotating the plate W fixed to the main shaft 20, the processing tool 3 is brought into contact with the first main surface S1 of the plate W. Thus, the first level-changing portion 41 (see FIG. 3) extending from the first main surface S1 toward the second main surface S2 is formed.

First, the control device 200 rotates the plate W, fixed by the fixing jig 11, together with the receiving jig 21 and the fixing jig 11 around the rotational axis O substantially perpendicular to the receiving surface A1 of the receiving jig 21 (Step S203). The term "substantially perpendicular" denotes that the rotational axis O is perpendicular to a stepless flat surface of the receiving surface A1 of the receiving jig 21 attached to the main shaft 20. In a case where the receiving surface is not flat and is provided with projections or the like as described above, the term "substantially perpendicular" denotes that the rotational axis O is perpendicular to a surface supported by top portions of the projections or the like.

Next, the control device 200 causes the processing roller 31 to contact the first main surface S1 of the plate W and press the plate W in a direction parallel to the rotational axis O. Thus, the first level-changing portion 41 extending from the first main surface S1 toward the second main surface S2 is formed (Step S204).

Second Forming Step

In the second forming step, while rotating the plate W fixed to the main shaft 20, the processing tool 3 is brought into contact with the second main surface S2 of the plate W at an outer peripheral side of the first level-changing portion 41. Thus, a second level-changing portion 51 (see FIG. 4) extending in an opposite direction to the first level-changing portion 41 is formed. Specifically, the control device 200 causes the processing roller 31 of the processing tool 3 to contact the second main surface S2 of the plate W at the outer peripheral side of the first level-changing portion 41 and press the plate W in a direction parallel to the rotational axis O. With this, the second level-changing portion 51 extending in the opposite direction to the first level-changing portion 41 is formed (Step S205). As described above, the arrangement of the plate W may be reversed. In other words, the receiving surface A1 of the receiving jig 21 may receive the first main surface S1 of the plate W, and the fixing jig 11 may contact the second main surface S2 of the plate W. In this case, in Step S204, the processing roller 31 should contact the plate W from below, and in Step S205, the processing roller 31 should contact the plate W from above.

As explained above, by causing the processing tool 3 to contact the first main surface S1 and second main surface S2 of the plate W, the first level-changing portion 41 and the second level-changing portion 51 extending in the opposite direction to the first level-changing portion 41 are sequentially formed. By such two-step spinning forming, the depressions and projections can be formed on the plate W without using a mandrel (shaping die), and the direction in which the depressions and projections are lined up can be set freely. Therefore, the plate W can be formed to have arbitrary depressions and projections.

Figure 3:
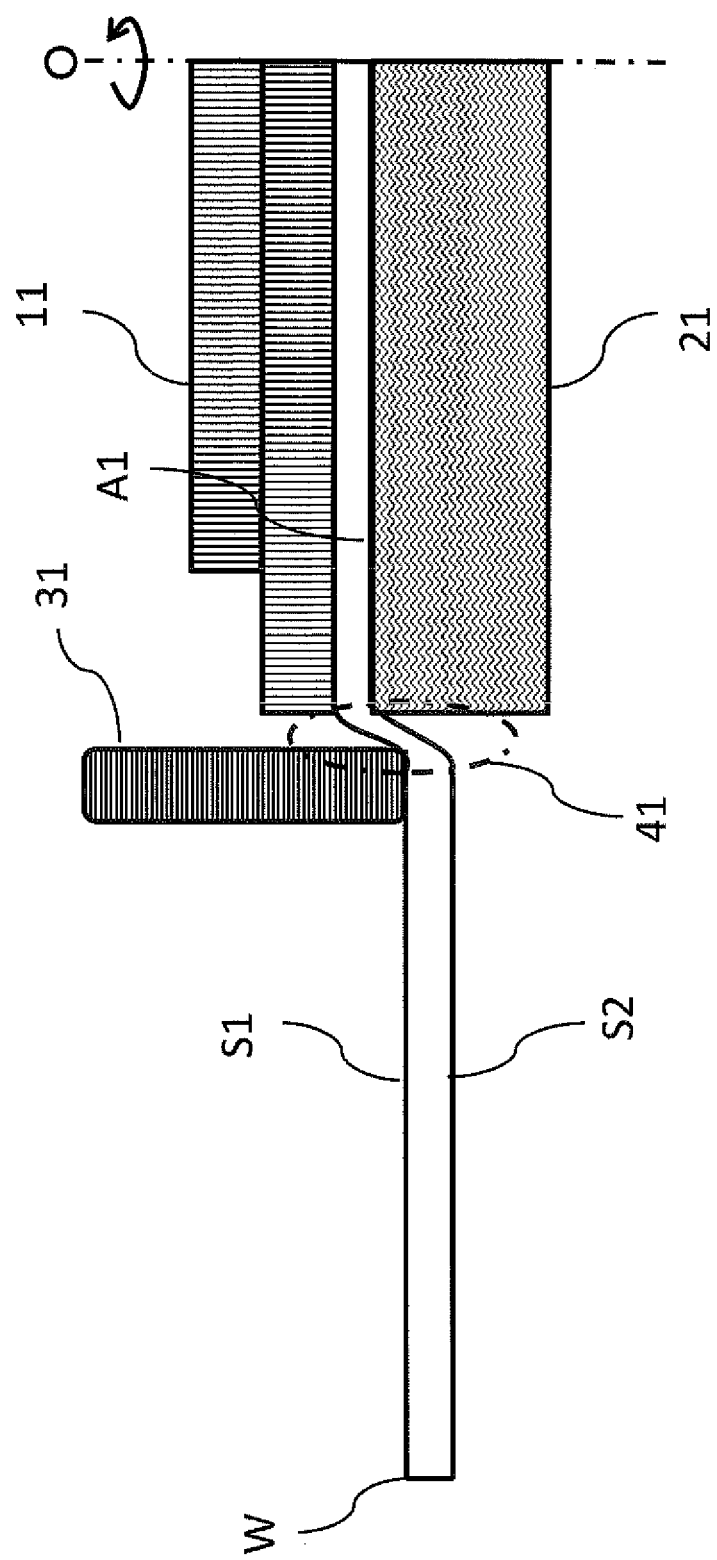
FIG. 3 is a schematic diagram for explaining an example of formation of a first level-changing portion in Embodiment 2 of the present invention.

In FIG. 3, a formation start position (starting point of the first level-changing portion 41) coincides with a peripheral portion of the receiving jig 21. However, in the case of locally heating the plate W as in Embodiment 7 described later, the plate W can be formed so as to be spaced apart from the receiving jig 21 in a radially outer direction. In this case, the receiving surface A1 of the receiving jig 21 does not necessarily have a circular shape and may have, for example, a polygonal shape. Or, the receiving jig 21 may have a parallel-cross shape formed by assembling a plurality of bars crossways.

Embodiment 2

In Embodiment 2 of the present invention, after the first level-changing portion 41 is formed, the plate W turned over is fixed again, and the second level-changing portion 51 is then formed. Further, Embodiment 2 proposes that: when forming the first level-changing portion 41, the receiving jig 21 is used as a first receiving jig 21; and when forming the second level-changing portion 51, a second receiving jig 22 larger than the first receiving jig 21 is used. The second receiving jig 22 has a shape suitable for fixing again the turned-over plate W which has been formed to have the first level-changing portion 41. The second receiving jig 22 is replaced with the first receiving jig 21 to be attached to the main shaft 20. Hereinafter, the receiving surface A1 explained in Embodiment 1 is referred to as a first receiving surface A1.

Figure 4:
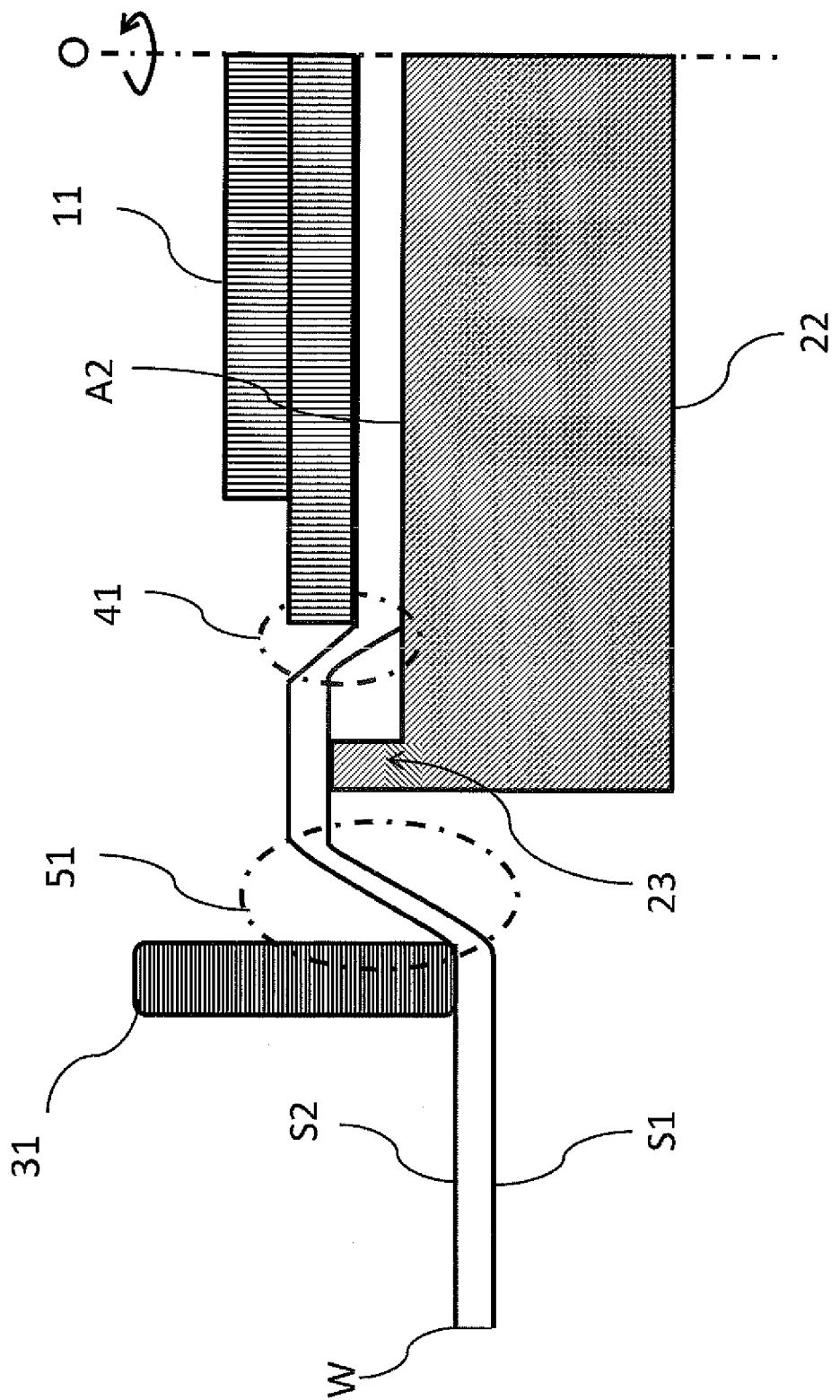
FIG. 4 is a schematic diagram for explaining an example of formation of a second level-changing portion in Embodiment 2 of the present invention.
Figure 5:
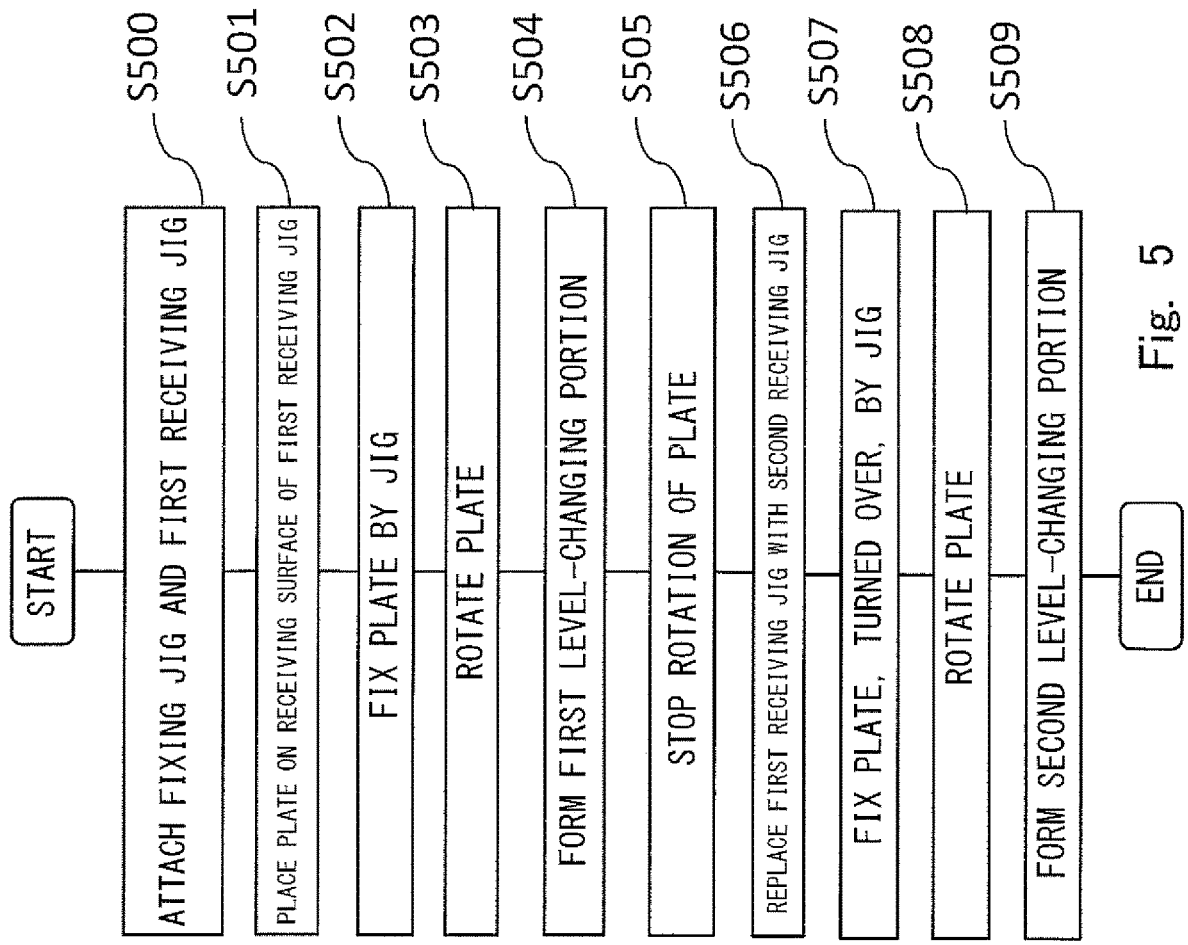
FIG. 5 is a flow chart showing one example of the spinning forming method according to Embodiment 2 of the present invention.

FIG. 3 is a schematic diagram for explaining an example of the formation of the first level-changing portion in Embodiment 2 of the present invention. FIG. 4 is a schematic diagram for explaining an example of the formation of the second level-changing portion in Embodiment 2 of the present invention. FIG. 5 is a flow chart showing one example of the spinning forming method according to Embodiment 2 of the present invention. Hereinafter, the flow chart shown in FIG. 5 will be explained in reference to FIGS. 3 and 4. The spinning forming method of the present embodiment includes the preparing step, the first forming step, an intermediate step, and the second forming step, and these steps are executed in this order.

Preparing Step and First Forming Step

First, the flow (Steps S500 to S504) from the step (Step S500) of attaching the fixing member 1 and the rotating member 2 to the step (Step S504) of forming the first level-changing portion 41 in FIG. 5 is the same as the flow from Step S200 to Step S204 in FIG. 2.

As shown in FIG. 3, the processing roller 31 is brought into contact with a position of the first main surface S1 of the plate W sandwiched between the first receiving jig 21 and the fixing jig 11, the position being located in the vicinity of a fixed portion of the plate W. With this, the first level-changing portion 41 is formed (Step S504). To be specific, the first level-changing portion 41 shown in FIG. 3 is formed in such a manner that in a state where the processing roller 31 is brought into contact with the main surface S1 of the plate W, the processing roller 31 is caused to perform a predetermined displacement from a fixed position of the plate W toward the first receiving jig 21 in a direction parallel to the rotational axis O. In Step S504, the first level-changing portion 41 that is the same in height as a below-described protruding portion 23 of the second receiving jig 22 is formed.

Intermediate Step

After the first level-changing portion 41 is formed (Step S504), the control device 200 separates the processing roller 31 from the plate W and stops the rotation of the motor D1 for rotating the main shaft 20. With this, the rotation of plate W is stopped (Step S505). The processing roller 31 is moved by controlling the rotations of the x-axis motor M1 and the z-axis motor M2 such that the first receiving jig 21 used to form the first level-changing portion 41 can be replaced with the second receiving jig 22 used to form the second level-changing portion 51.

Next, the first receiving jig 21 used to form the first level-changing portion 41 is replaced with the second receiving jig 22 used to form the second level-changing portion 51 (Step S506). As shown in FIG. 4, the second receiving jig 22 includes: a circular second receiving surface A2 larger in diameter than the first receiving surface A1 of the first receiving jig 21; and an annular protruding portion 23 formed at a peripheral portion of the second receiving surface A2. In the present embodiment, both the second receiving surface A2 and the protruding portion 23 receive the first main surface S1 of the plate W. More specifically, when the plate W is turned over, that is, when the first main surface S1 is the lower surface, and the second main surface S2 is the upper surface, the protruding portion 23 supports a bottom portion of the first level-changing portion 41 of the plate W. In other words, the second receiving surface A2 receives a portion of the first main surface S1 of the plate W, the portion being located at a radially inner side of the first level-changing portion 41. In the present embodiment, the protruding portion 23 includes a flat top surface that surface-contacts the first main surface S1 of the plate W. The operation of replacing the first receiving jig 21 with the second receiving jig 22 may be automatically executed by an industrial robot (not shown) or manually performed by an operator.

Next, the plate W turned over is placed on the second receiving jig 22. With this, a middle portion of the first main surface S1 of the plate W is received by the second receiving surface A2 of the second receiving jig 22, and the bottom portion of the first level-changing portion 41 of the plate W (i.e., a portion, surrounding the middle portion, of the first main surface S1) is supported by the annular protruding portion 23 of the second receiving jig 22. Here, by tuning over the plate W, the first main surface S1 of the plate W is located at the side where the rotating member 2 is provided (i.e., the side where the receiving jig 22 is provided), and the second main surface S2 of the plate W is located at the side where the fixing member 1 is provided (i.e., the side where the fixing jig 11 is provided). Then, the plate W is fixed again by the fixing jig 11 (Step S507). To be specific, the turned-over plate W is fixed to the main shaft 20 via the second receiving jig 22 by the fixing jig 11. It should be noted that these operations are manually performed by an operator but may be automatically executed by the control device 200.

Second Forming Step

Next, the control device 200 rotates the plate W, fixed by the fixing jig 11, together with the second receiving jig 22 and the fixing jig 11 around the rotational axis O substantially perpendicular to the second receiving surface A2 of the second receiving jig 22 (Step S508).

Next, the control device 200 causes the processing roller 31 to contact the second main surface S2, which is opposite to the surface contacted by the processing roller 31 when the first level-changing portion 41 is formed, at the outer peripheral side of the first level-changing portion 41. Thus, the second level-changing portion 51 extending in the opposite direction to the first level-changing portion 41 is formed (Step S509). To be specific, the second level-changing portion 51 shown in FIG. 4 is formed in such a manner that in a state where the processing roller 31 is brought into contact with the second main surface S2 of the plate W, the processing roller 31 is caused to perform a predetermined displacement from a position of the second main surface S2 of the plate W toward the second receiving jig 22 in a direction parallel to the rotational axis O, the position corresponding to the bottom portion of the first level-changing portion 41 supported by the protruding portion 23.

As above, when forming the second level-changing portion 51, the plate W is turned over, and the receiving surface A2 and protruding portion 23 of the second receiving jig 22 receive the plate W. With this, when forming the first level-changing portion 41 and the second level-changing portion 51, the processing roller 31 can always contact the main surface of the plate W, the main surface being located at the side where the fixing member 1 is provided. Therefore, the operation of positioning the processing roller 31 can be simplified. It should be noted that since the other components, the other steps, and modification examples thereof are the same as those of Embodiment 1, explanations thereof are omitted.

In Step S504, the first level-changing portion 41 lower in height than the protruding portion 23 of the second receiving jig 22 may be formed. In this case, when the plate W turned over is placed on the second receiving jig 22, only the protruding portion 23 of the second receiving jig 22 receives the first main surface S1 of the plate W. This is advantageous in that the formation can be performed even in a case where the first level-changing portion 41 is lower in height than the protruding portion 23.

Embodiment 3

In Embodiment 3 of the present invention, an edge portion that is pointed toward a predetermined radial position P1 of the bottom portion of the first level-changing portion 41 is formed at a tip end of the annular protruding portion 23 formed at the peripheral portion of the circular receiving surface A2 of the second receiving jig 22.

Figure 6A:
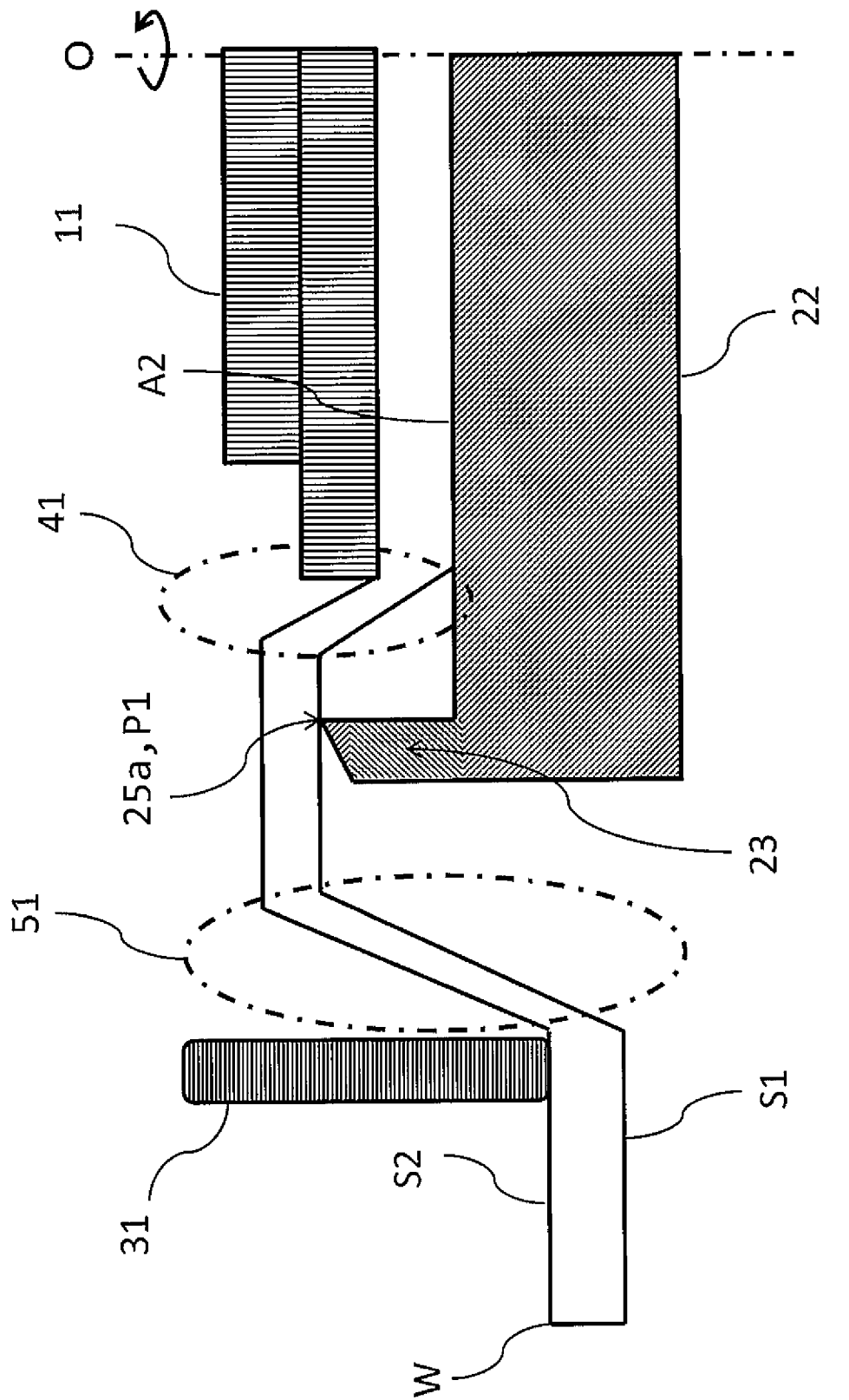
FIG. 6A is a schematic diagram showing an example of the shape of a second receiving jig in Embodiment 3 of the present invention.
Figure 6B:
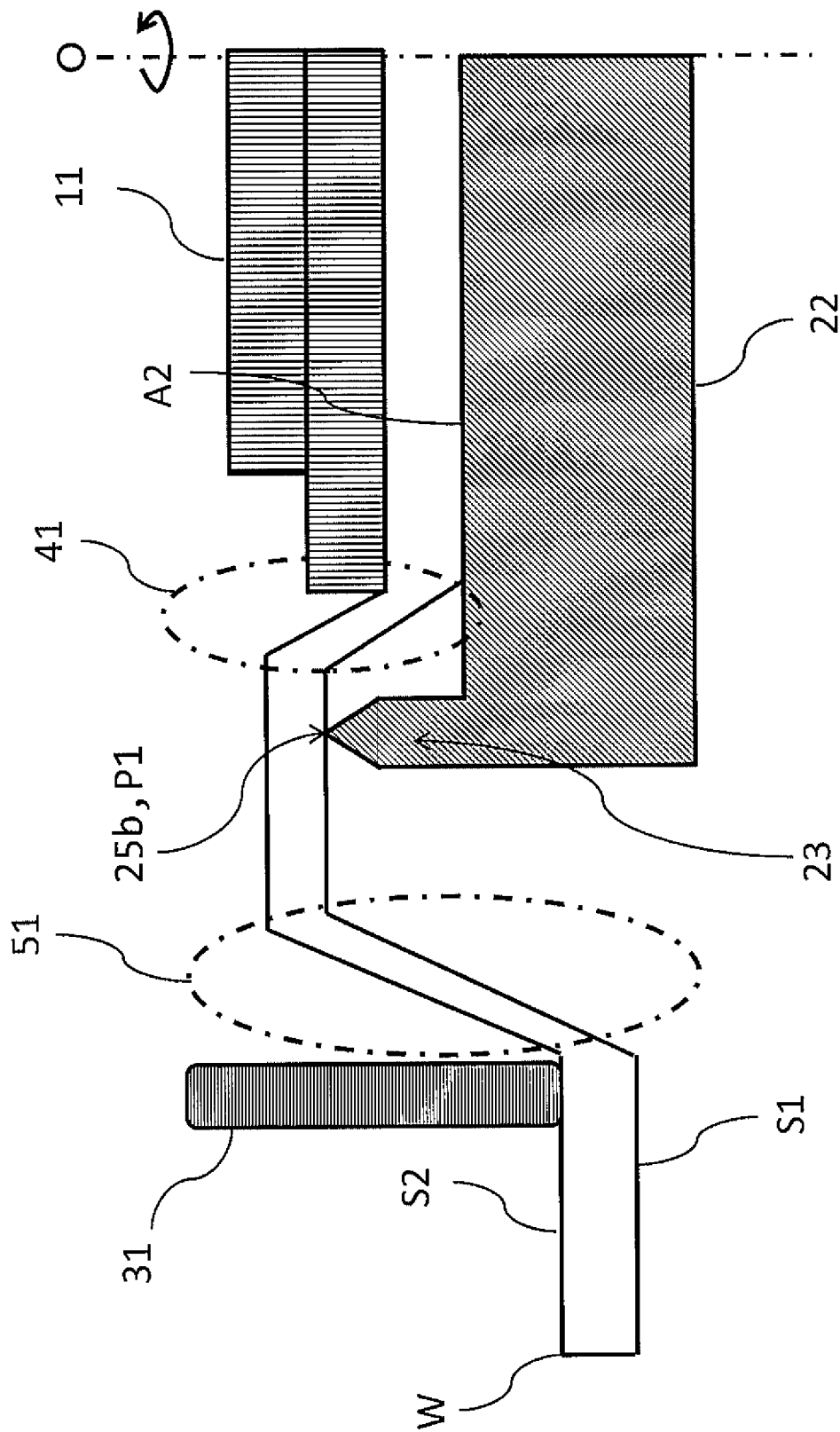
FIG. 6B is a schematic diagram showing another example of the shape of the second receiving jig in Embodiment 3 of the present invention.

FIG. 6A is a schematic diagram showing an example of the shape of the second receiving jig in Embodiment 3 of the present invention. FIG. 6B is a schematic diagram showing another example of the shape of the second receiving jig in Embodiment 3 of the present invention.

An edge portion 25a of the annular protruding portion 23 shown in FIG. 6A is formed so as to have an incline in an obliquely downward direction from an inner edge of the protruding portion 23 toward an outer edge thereof and to annularly support the predetermined radial position P1 of the bottom portion of the first level-changing portion 41 at the inner edge of the protruding portion 23.

An edge portion 25b of the annular protruding portion 23 shown in FIG. 6B is formed so as to have inclines in obliquely downward directions from a middle portion of the protruding portion 23 toward the inner edge and outer edge of the protruding portion 23 and to annularly support the predetermined radial position P1 of the bottom portion of the first level-changing portion 41 at the middle portion of the protruding portion 23.

Instead of the edge portions (25a and 25b) shown in FIGS. 6A and 6B, an edge portion 25c (see FIG. 7) of the protruding portion 23 may be adopted, which has an incline in an obliquely downward direction from the outer edge of the protruding portion 23 toward the inner edge thereof and annularly support the predetermined radial position P1 of the bottom portion of the first level-changing portion 41.

It should be noted that the predetermined radial position P1 is not especially limited as long as the predetermined radial position P1 is located in a region of the bottom portion of the first level-changing portion 41.

In a case where the tip end of the protruding portion 23 is flat, the position of a reaction force working point that restrains the bottom portion of the first level-changing portion 41 may change within a range of the width of the protruding portion 23 at the time of the formation. However, in a case where the edge portion is formed at the tip end of the protruding portion 23, the position of the reaction force working point can be made constant in the radial direction over the entire periphery. With this, the deformation amount of the plate W at the time of the formation can be stabilized in the circumferential direction. It should be noted that the other components, the other steps, and modification examples thereof are the same as those of Embodiment 1 or 2, explanations thereof are omitted.

Embodiment 4

In Embodiment 4 of the present invention, when forming the second level-changing portion 51, the processing tool 3 is brought into contact with the second main surface S2 of the plate W in the vicinity of the edge portion of the second receiving jig 22, in other words, the position with which the processing roller 31 contacts and the position supported by the protruding portion 23 of the second receiving jig 22 are brought close to each other.

Figure 7:
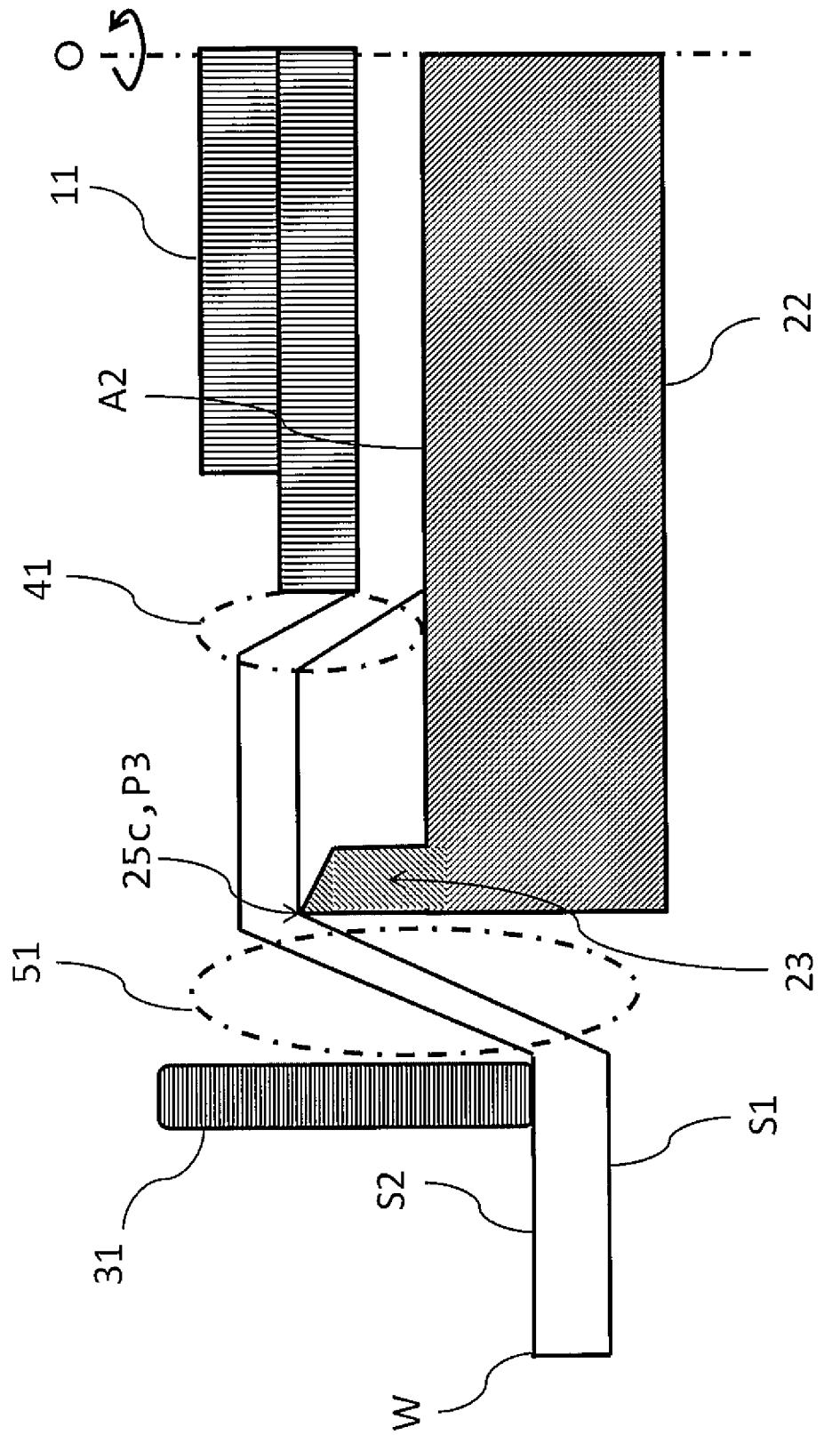
FIG. 7 is a schematic diagram showing an example of the shape of the second receiving jig in Embodiment 4 of the present invention.

FIG. 7 is a schematic diagram showing an example of the shape of the second receiving jig in Embodiment 4 of the present invention.

The edge portion 25c of the annular protruding portion 23 shown in FIG. 7 annularly supports a predetermined position (predetermined radial position of the bottom portion of the first level-changing portion 41) P3 in a radial direction around the rotational axis O, the position being located in the vicinity of a position of the plate W contacted by the processing roller 31 when forming the second level-changing portion 51. In the present embodiment, the predetermined radial position P3 is the position of a start point of the second level-changing portion 51 of the first main surface S1 side of the plate W. The edge portion 25c has an incline in an obliquely downward direction from the outer edge of the protruding portion 23 toward the inner edge thereof such that the edge portion 25c is brought close to the position, with which the processing roller 31 contacts, as much as possible. The edge portion 25c annularly supports the predetermined radial position P3 of the bottom portion of the first level-changing portion 41 at the outer edge of the protruding portion 23.

As above, when forming the second level-changing portion 51, the radial position of the plate W contacted by the processing roller 31 and the predetermined radial position P3 of the plate W supported by the edge portion 25c of the second receiving jig 22 are brought close to each other. With this, the plate W is started to be bent from the predetermined radial position P3 supported by the edge portion 25c. Thus, it is possible to reduce the deflection of the plate W at a radially inner side of the formation start position of the second level-changing portion 51. It should be noted that the other components, the other steps, and modification examples thereof are the same as those of Embodiment 1 or 2, explanations thereof are omitted.

Embodiment 5

Embodiment 5 of the present invention proposes that: when forming the first level-changing portion 41, the fixing jig 11 is used as a first fixing jig 11; and when forming the second level-changing portion 51, a second fixing jig 14 suitable for increasing a pressing force applied from the processing roller 31 to the plate W is used.

Figure 8A:
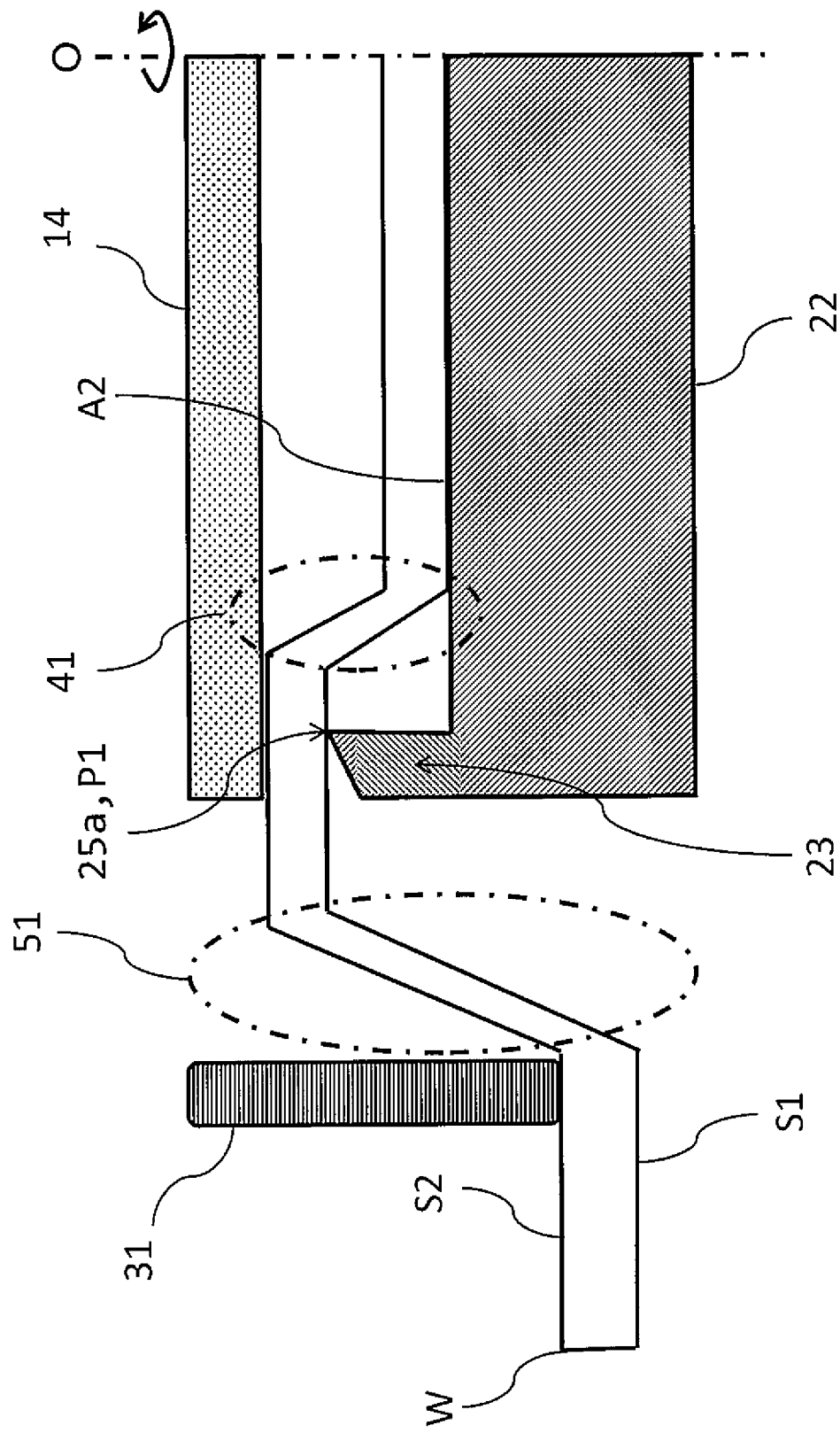
FIG. 8A is a schematic diagram showing an example of the shape of a second fixing jig in Embodiment 5 of the present invention.
Figure 8B:
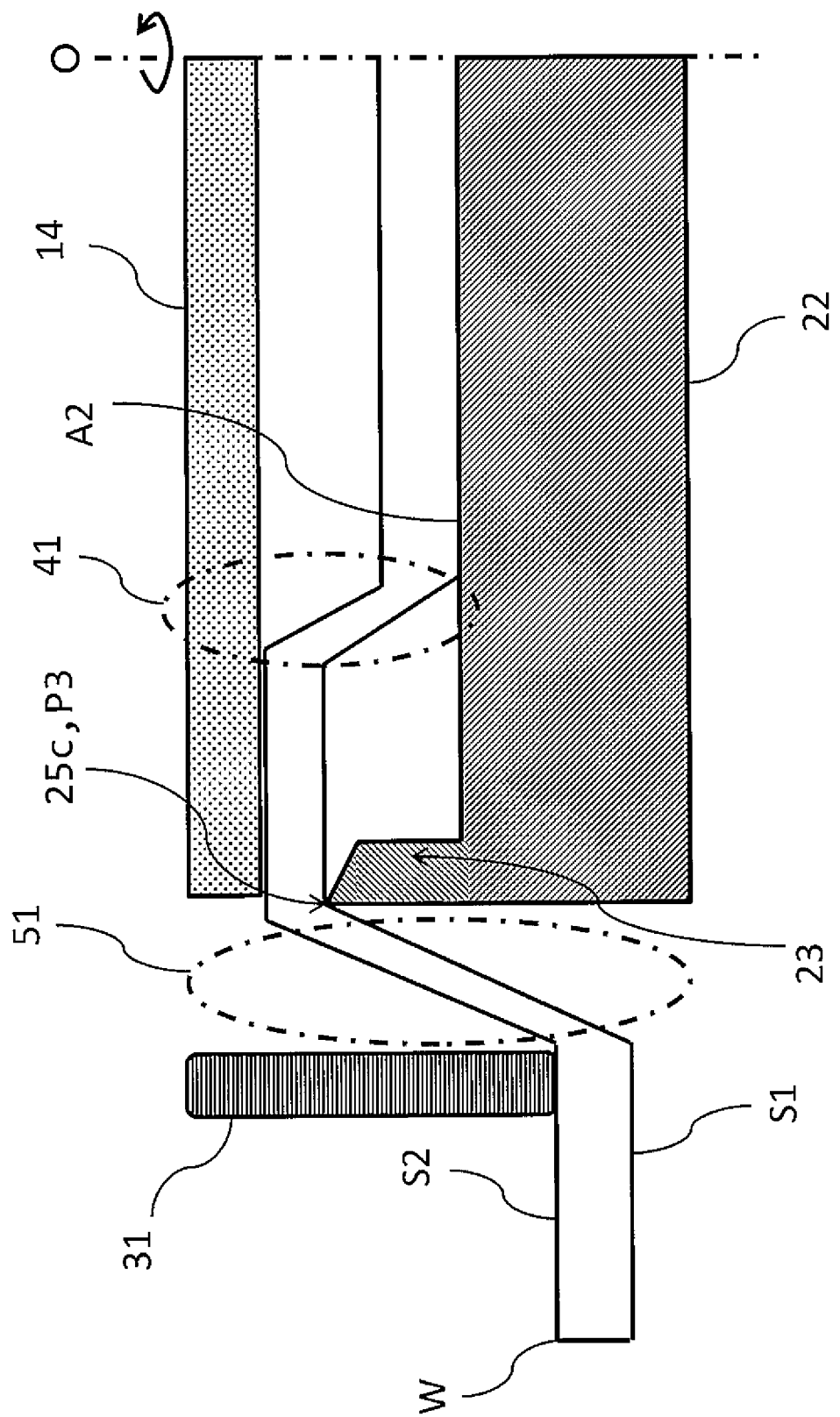
FIG. 8B is a schematic diagram showing another example of the shape of the second fixing jig in Embodiment 5 of the present invention.

FIG. 8A is a schematic diagram showing an example of the shape of the second fixing jig in Embodiment 5 of the present invention. FIG. 8B is a schematic diagram showing another example of the shape of the second fixing jig in Embodiment 5 of the present invention.

The second fixing jig 14 shown in FIG. 8A corresponds to the second receiving jig 22 shown in FIG. 6A, and the second fixing jig 14 shown in FIG. 8B corresponds to the second receiving jig 22 shown in FIG. 6B. Each of the second fixing jigs 14 shown in FIGS. 8A and 8B has a size that is not smaller than a minimum diameter of a portion where the protruding portion 23 of the second receiving jig 22 contacts the plate W. In a case where the edge portion is formed at the tip end of the protruding portion 23 as shown in FIGS. 6A and 6B, the "minimum diameter" denotes a diameter defined by the top of the edge portion. In a case where the protruding portion 23 has the flat top surface as shown in FIG. 4, the "minimum diameter" denotes an inner diameter of the top surface. The second level-changing portion 51 is formed as below by using the second fixing jig 14. For example, the second fixing jig 14 is a circular plate having a diameter not smaller than the minimum diameter of the portion where the protruding portion 23 contacts the plate W.

First, after the first level-changing portion 41 is formed, the rotation of the plate W is stopped. Then, the first receiving jig 21 for the first level-changing portion 41 is replaced with the second receiving jig 22 for the second level-changing portion 51, and the first fixing jig 11 for the first level-changing portion 41 is replaced with the second fixing jig 14 for the second level-changing portion 51. These replacing operations are performed in the intermediate step explained in Embodiment 2.

Next, the plate W turned over is placed on the second receiving jig 22. With this, the middle portion of the first main surface S1 of the plate W is received by the second receiving surface A2 of the second receiving jig 22, and the bottom portion of the first level-changing portion 41 of the plate W (i.e., the portion, surrounding the middle portion, of the first main surface S1) is supported by the annular protruding portion 23 of the second receiving jig 22. The plate W is fixed again in such a manner that the bottom portion of the first level-changing portion 41 of the plate W is clamped by the protruding portion 23 of the second receiving jig 22 and the peripheral portion of the second fixing jig 14. To be specific, the plate W is fixed to the main shaft 20 via the second receiving jig 22 by the second fixing jig 14. It should be noted that this operation is manually performed by an operator but may be automatically executed by the control device 200. After the plate W is fixed again, the plate W is rotated, and the processing roller 31 is brought into contact with the second main surface S2 of the plate W at the outer peripheral side of the bottom portion of the first level-changing portion 41. With this, the second level-changing portion 51 is formed.

As above, when forming the second level-changing portion 51, the plate W is fixed in such a manner that the bottom portion of the first level-changing portion 41 is sandwiched between the annular protruding portion 23 of the second receiving jig 22 and the peripheral portion of the second fixing jig 14. With this, the pressing force applied to the plate W at a position where the plate W is sandwiched can be increased. Thus, the pressing force applied from the processing roller 31 to the plate W can be increased. As a result, the formation can be realized more stably. It should be noted that the other components, the other steps, and modification examples thereof are the same as those of Embodiment 1 or 2, explanations thereof are omitted.

Embodiment 6

Embodiment 6 of the present invention proposes that multistage forming of the plate W is performed by repeatedly performing the formation of the first level-changing portion 41 (first forming step) and the formation of the second level-changing portion 51 (second forming step) in the spinning forming method according to Embodiments 1 to 5. When forming the first level-changing portion 41 for the second or subsequent time, the plate W is turned over in order to return to a state where the first level-changing portion 41 has been formed for the first time from a previous state where the second level-changing portion 51 has been formed. In the case of Embodiments 2 to 5 including the replacement of the jigs, when forming the first level-changing portion 41 for the second or subsequent time, the level-changing portion has already been formed on the plate W, so that it is desirable that as with the second receiving jig 22, the first receiving jig 21 used when forming the first level-changing portion 41 for the second or subsequent time include the protruding portion that supports the bottom portion of the first level-changing portion 41 which has already been formed. It is desirable that the second receiving jig 22 used when forming the second level-changing portion 51 for the second or subsequent time include the protruding portion 23 located at the outer peripheral side of the protruding portion 23 of the second receiving jig 22 used when forming the second level-changing portion 51 before the second or subsequent time.

As above, by the multistage spinning forming in which the first level-changing portion 41 and the second level-changing portion 51 are sequentially, repeatedly formed, the plate W can be formed to have more complex depressions and projections.

Embodiment 7

Figure 9:
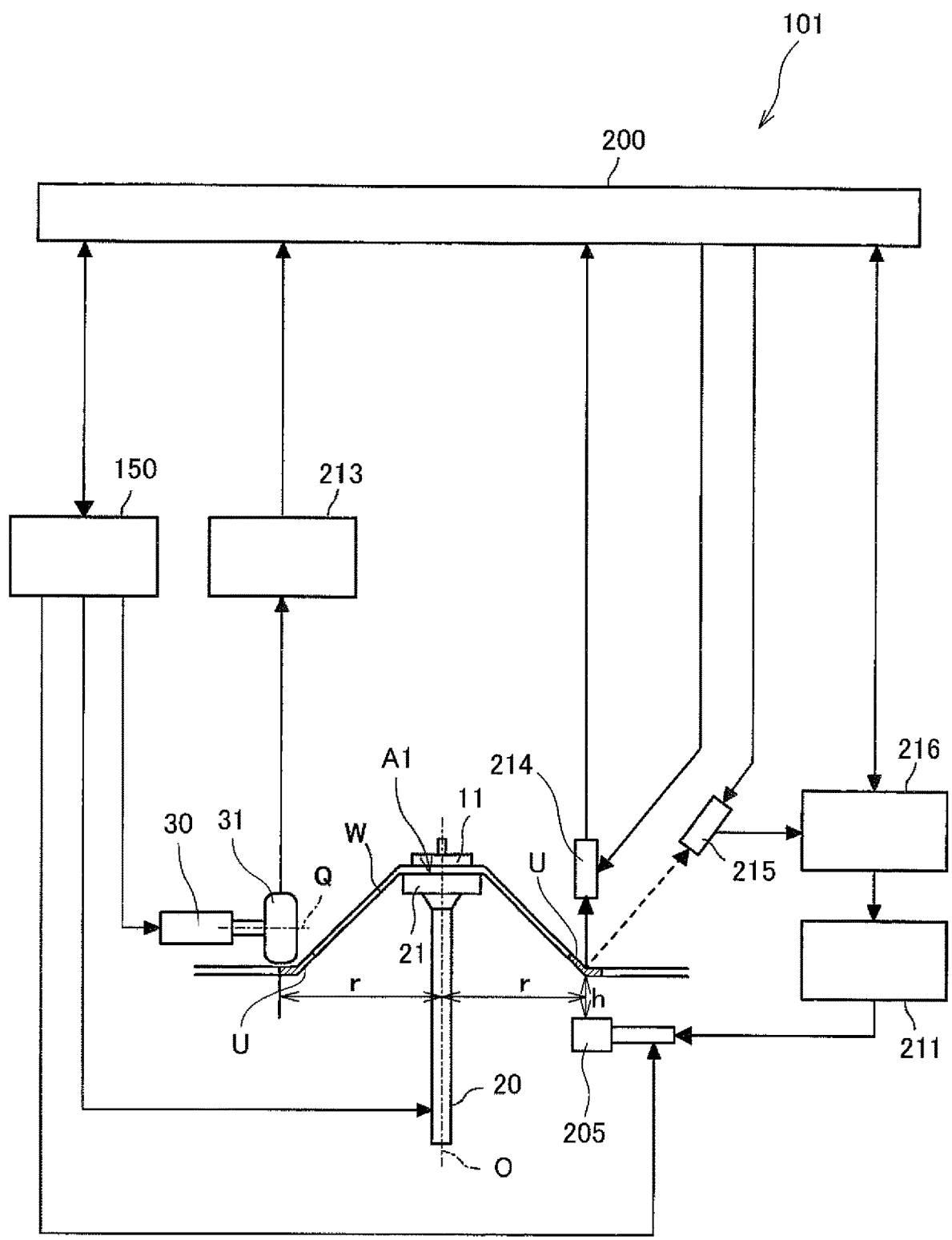
FIG. 9 is a schematic configuration diagram showing the spinning forming apparatus according to Embodiment 6 of the present invention.

FIG. 9 is a schematic configuration diagram showing the spinning forming apparatus according to Embodiment 7 of the present invention. In the present embodiment, when forming the plate W such that the plate W has the depressions and projections, hot processing is performed while heating the plate W by a below-described heater. Hereinafter, the present embodiment will be explained while partially repeating the explanations of the above components. The following will explain the configuration and method related to the formation of the first level-changing portion 41. Therefore, a below-described formation target portion U denotes a portion of the plate W, the portion being contacted by the processing roller 31 when forming the first level-changing portion 41. The explanations regarding the configuration and method related to the formation of the second level-changing portion 51 are omitted since they are the same as the explanations related to the formation of the first level-changing portion 41. In addition, the following presupposes that the first level-changing portion 41 and the second level-changing portion 51 are separately formed by using the first receiving jig 21 and the second receiving jig 22. However, both the first level-changing portion 41 and the second level-changing portion 51 can be formed by using only one receiving jig 21.

As shown in FIG. 9, a spinning forming apparatus 101 according to the present embodiment includes the main shaft 20 configured to rotate around the predetermined rotational axis O. The plate W that is a formation target material is attached to the main shaft 20 without via a mandrel (metal die). More specifically, the first receiving jig 21 having the first receiving surface A1 substantially perpendicular to the rotational axis O is attached to the main shaft 20 so as not to be rotatable relative to the main shaft 20. The plate W is attached onto the receiving surface A1. The plate W is fixed to the first receiving surface A1 of the first receiving jig 21 in such a manner that the first fixing jig 11 provided so as to face the first receiving surface A1 contacts the main surface of the plate W. With this, the main shaft 20 rotates around the rotational axis O, and therefore, the plate W rotates around the rotational axis O.

The material of the plate W is not especially limited as long as the material is suitable for the hot processing. A metal material that is difficult to be subjected to cold processing is preferable. Examples of such metal material include a titanium alloy, a nickel-based alloy, a cobalt-based alloy, high-strength steel, high-strength stainless steel, and a magnesium alloy. Especially in the case of a material, such as the titanium alloy, whose difference between the yield strength at a normal temperature and the yield strength at a high temperature (formation temperature) is large, cracks and deformations easily occur by conventional methods. Therefore, when forming such material, the application of the present embodiment is effective. It should be noted that the present embodiment is also applicable to metal materials, such as an aluminum alloy and pure titanium, which can be subjected to the cold processing. When the plate made of the metal material which can be subjected to the cold processing is thick, the application of the present embodiment is effective.

The spinning forming apparatus 101 includes: a the processing roller 31 configured to contact one of main surfaces of the plate W, attached to the main shaft 20, to process and form the plate W; and a heater 205 configured to heat the plate W. The heater 205 is provided on the opposite side of the processing tool 3 across the plate W. The heater 205 locally heats a position of a main surface of the plate W, the main surface being opposite to a main surface with which the processing roller 31 contacts, the position being located on a circumference around the rotational axis O, the circumference being defined by a position, with which the processing roller 31 contacts, of the plate W. It should be noted that when, for example, a distance between the rotational axis O and the position, with which the processing roller 31 contacts, of the plate W is denoted by r, the term "circumference" means a region where a distance between the rotational axis O and the position heated by the heater 5 is denoted by r±10%.

In the present embodiment, as shown in FIG. 9, one processing roller 31 is included. However, the configuration is not limited to this, and the processing rollers 31 may be included. In this case, each of the processing rollers is arranged so as to contact one of the main surfaces of the plate W. Further, for example, the processing rollers may be arranged on the same circumference around the rotational axis O so as to be separated from each other by 180° around the rotational axis O.

Figure 10:
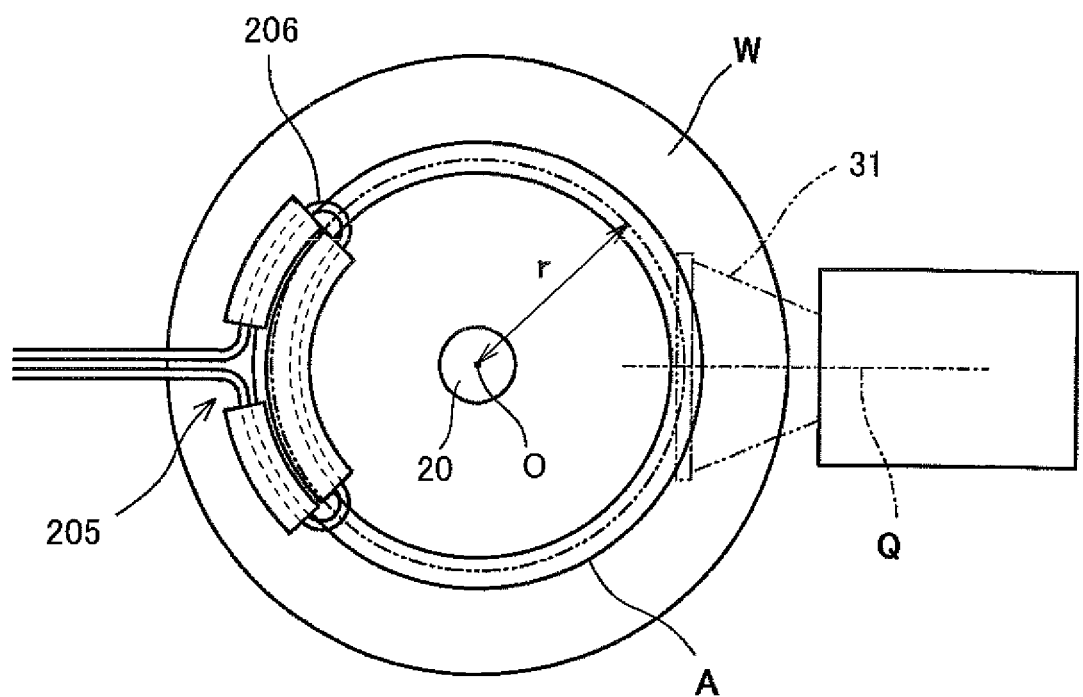
FIG. 10 is a plan view showing a relationship among a rotational axis, a processing tool, and a heater in the spinning forming apparatus of FIG. 9.

FIG. 10 is a plan view showing a relationship among the rotational axis O, the processing tool, and the heater 205 in the spinning forming apparatus of FIG. 9. FIG. 10 is a plan view when viewed from the rear surface side (side where the heater 205 is located) of the plate, and the components other than the main shaft 20, the processing roller 31, the heater 205, and the plate W shown in FIG. 9 are not shown in FIG.

10. In the present embodiment, for example, the processing roller 31 is configured to rotate around a rotational axis Q that forms a predetermined angle (about 90° in the example of FIG. 10) relative to the rotational axis O. The processing roller 31 is located at one main surface side, where the fixing jig 11 shown in FIG. 9 is provided, of the plate W, and when the processing roller 31 rotates around the rotational axis Q to contact the main surface of the plate W, the plate W is subjected to ironing or drawing. The heater 205 is located at the other main surface side, where the main shaft 20 shown in FIG. 9 is provided, of the plate W. Both the processing roller 31 and the heater 205 are independently movable three-dimensionally (at least in an axial direction and radial direction of the rotational axis O) relative to the main shaft 20, and the positions of the processing roller 31 and the heater 205 are controlled such that each of a distance from the rotational axis O to the processing roller 31 and a distance from the rotational axis O to the heater 205 becomes the distance r (r is variable).

The heater 205 includes a coil 206 configured to heat the rear surface of the plate W by high frequency induction heating. A current is supplied from an induction heating power supply 211 to the coil 206. In the present embodiment, the heater 205 is located at a position symmetrical to the processing roller 31 across the rotational axis O (main shaft 20) in plan view. To be specific, the heater 205 is located at the position separated from the position of the processing tool 3 (the processing roller 31) in a circumferential direction around the rotational axis O by an angle θ that is 180° around the rotational axis O. It should be noted that the position of the heater 205 is not limited to this as long as the heater 205 can locally heat a position of a main surface of the plate W, the main surface being located at the opposite side of the front surface side, with which the processing roller 31 contacts, of the plate W, the position being located on a circumference around the rotational axis O, the circumference being defined by the position, with which the processing roller 31 contacts, of the plate W. For example, the heater 205 may be provided such that in plan view, a center angle θ between the heater 205 and the processing roller 31 (i.e., an angle between a line connecting the heater 205 and a central axis S and a line connecting the processing roller 31 and the central axis S in the circumferential direction) becomes a predetermined angle (0°≤θ≤360°).

The coil 206 of the heater 205 is formed to have a circular-arc shape that is doubled in a direction perpendicular to the rotational axis O. Specifically, the coil 206 of the heater 205 is formed in a crescent shape such that an angle formed by both circular-arc end portions of the coil 206 and the rotational axis O in the circumferential direction becomes substantially 90°. With this, the heater 205 can efficiently heat the portion on the circumference around the rotational axis O, the circumference being defined by the formation target portion U. It should be noted that the shape of the coil 206 is not limited to this. The angle formed by both circular-arc end portions and the rotational axis O may be an angle other than 90°. A part of the circular-arc shape may include a linear portion. The coil 206 may be formed so as to include the combination of linear lines (may be formed in the shape of a polygonal line). Instead of the coil 206 having the circular-arc shape, coils (cylindrical multiple-winding coils) each obtained by winding a wire multiple times in a circular shape may be arranged in a circular-arc shape, or a single cylindrical multiple-winding coil may be used as the coil of the heater 205.

According to the above configuration, the heater 205 locally heats the main surface opposite to the main surface, with which the processing roller 31 contacts, of the plate W, so that the heater 205 can efficiently heat the formation target portion U of the plate W regardless of the positional relationship between the processing roller 31 and the plate W. In addition, since the plate W is attached to the main shaft 20 without via a mandrel (shaping die), the heater 205 can easily, locally heat the formation target portion U. In the conventional hot processing, the mandrel is generally provided at the side of the surface opposite to the surface, with which the processing roller 31 contacts, of the plate W. Because of the mandrel, it is difficult to arrange a heating coil of the heater 205. Reasons for this are as below. To be specific, the heating coil is an induction heating coil formed by a copper pipe having a size of about several millimeters, and a core for concentrating magnetic flux and having a thickness of about several millimeters to 30 millimeters may be attached to a part of the coil. To arrange the heating coil as above, a certain amount of space is required. However, in a case where the heating coil is arranged immediately under the formation target portion U while using the mandrel, the mandrel and the heater contact each other, which is not preferable. In the present embodiment, the mandrel is not used, and the heater 205 is provided at a side of the plate W, the side being opposite to a side where the processing roller 31 is provided, and is located immediately under the formation target portion U of the plate W formed by the processing roller 31. If the heater 205 is provided at the side, where the processing roller 31 is provided, of the plate W, the shape of the heating coil of the heater 205 is limited by the formation design of the plate W. However, since the heating coil of the heater 205 is provided at a side (in the conventional configuration, the side where the mandrel is provided) of the plate W, the side being opposite to a side where the processing roller 31 is provided, the shape of the heating coil of the heater 205 is not limited by the formation design of the plate W. Therefore, according to the configuration of the present embodiment, the heater 205 is arranged at the side, where both the mandrel and the processing roller 31 are not provided, of the plate W, so that the heater 205 can easily, locally heat the formation target portion U. Further, by using the receiving jig that is much smaller than the mandrel, the heat by the heating of the heater 205 is not directly transferred to the receiving jig, so that the heater 205 can perform the heating more efficiently than a case where the mandrel is used. Further, in the present embodiment, the heating by the high frequency induction heating is performed. With this, the local heating can be performed easily and efficiently.

As shown in FIG. 9, the spinning forming apparatus 101 of the present embodiment includes: a formation control unit 150 configured to control the rotation of the main shaft 20 and the positions of the processing roller 31 and the heater 205; a load measuring unit 213 configured to measure a load applied to the plate W when the processing roller 31 contacts the plate W; and a displacement sensor 214 configured to detect the position of the formation target portion U of the plate W. Further, the spinning forming apparatus 101 includes: a radiation thermometer 215 configured to measure a surface temperature of a position (formation target portion U) of the plate W, the position being located on a circumference around the rotational axis O, the circumference being defined by the position with which the processing roller 31 contacts; and an output adjuster 216 configured to adjust an output of the heater 205. The output adjuster 216 adjusts the output of the heater 205 by changing the value of the current output from the induction heating power supply 211.

The spinning forming apparatus 101 includes the control device 200 configured to transmit control commands to respective components depending on formation conditions and driving states of the components. The formation control unit 150 may be incorporated in the control device 200. For example, the control device 200 controls the rotation of the main shaft 20, the positions of the processing roller 31 and the heater 205, and the positions of the displacement sensor 214 and the radiation thermometer 215 based on operation states (control states of the main shaft 20, the processing roller 31, and the heater 205) from the forming machine 30, information from the load measuring unit 213 regarding the load applied from the processing roller 31 to the plate W, and information from the displacement sensor 214 regarding the position of the formation target portion U of the plate W. In addition, the control device 200 controls the output of the heater 205 based on information from the radiation thermometer 215 regarding the surface temperature of the formation target portion U of the plate W.

Figure 11:
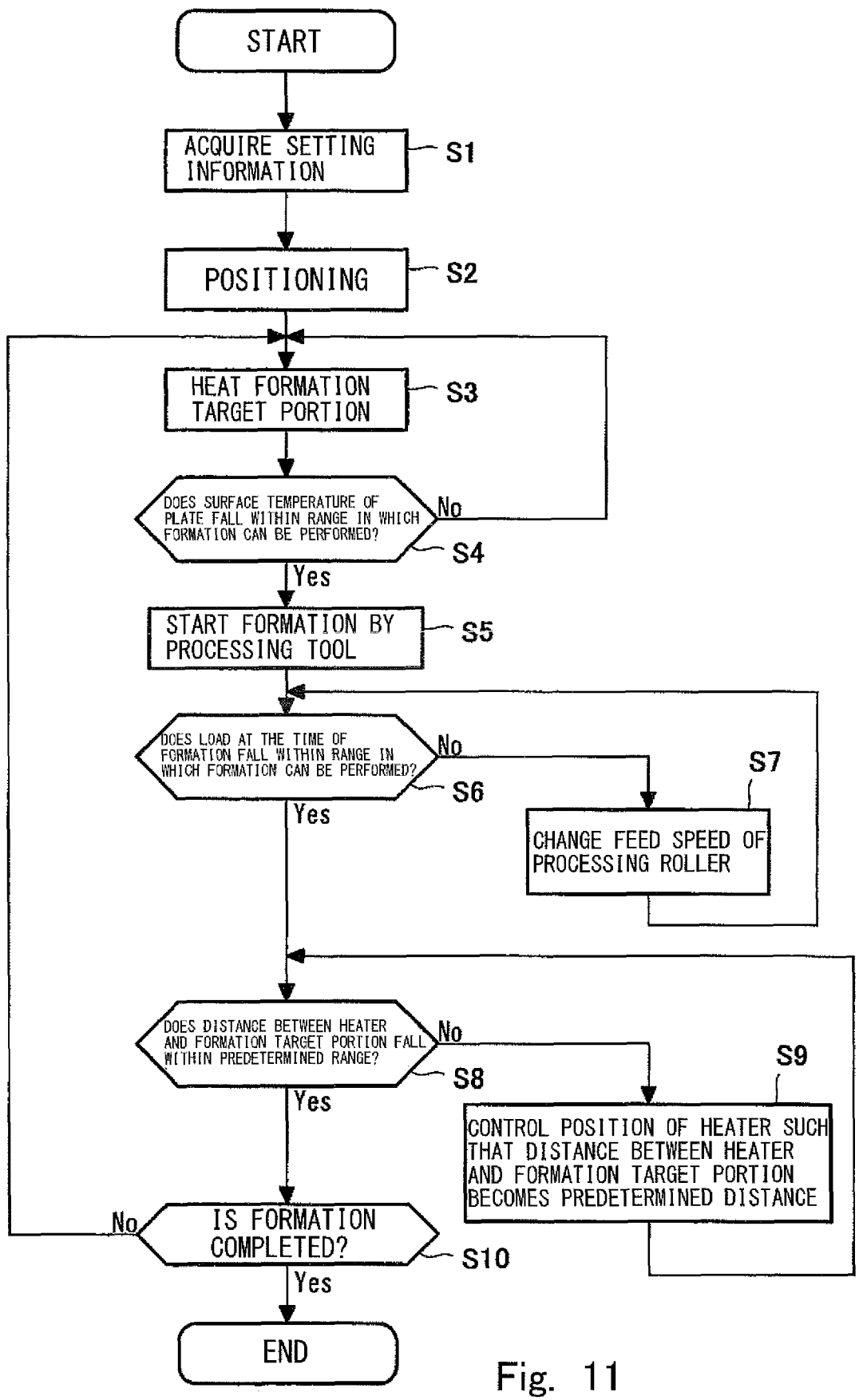
FIG. 11 is a flow chart showing one example of a control mode of the spinning forming apparatus shown in FIG. 9.

Hereinafter, one example of a control mode of the spinning forming apparatus 101 according to the present embodiment will be explained. FIG. 11 is a flow chart showing one example of the control mode of the spinning forming apparatus of FIG. 9. Here, the predetermined plate W is placed on the first receiving jig 21 in advance. As shown in FIG. 11, depending on the type, formation design, size, thickness, and the like of the plate W, the control device 200 first acquires setting information, such as a rotating speed of the main shaft 20, a feed speed of the processing roller 31 (a movement speed in a direction along the rotational axis O), a radial direction movement speed of the processing roller 31 (a movement speed of the processing roller in the radial direction around the rotational axis O), a formation angle of the processing roller 31 (an inclination of the rotational axis Q of the processing roller relative to the plate W), and a heating temperature (Step S1). The control device 200 may acquire the information from external devices or may read out and acquire the information stored in a storage portion included in the spinning forming apparatus 101.

After the setting information are acquired, the control device 200 positions the processing roller 31, the heater 205, the displacement sensor 214, and the radiation thermometer 215 (Step S2). Specifically, the control device 200 positions the processing roller 31 such that the processing roller 31 contacts the predetermined formation target portion U of the plate W, positions the heater 205 such that the heater 205 heats the formation target portion U (a region on the circumference around the rotational axis O), positions the displacement sensor 214 such that the displacement sensor 214 can measure the displacement of the formation target portion U, and positions the radiation thermometer 215 such that the radiation thermometer 215 can measure the surface temperature of the formation target portion U.

Then, the control device 200 rotates the main shaft 20 around the rotational axis O to rotate the plate W and causes the heater 205 to start heating the formation target portion U of the plate W (Step S3). The control device 200 acquires the surface temperature of the formation target portion U detected by the radiation thermometer 215 and determines whether or not the surface temperature of the formation target portion U is a temperature within a range in which the formation can be performed (Step S4). For example, in the case of using the plate W made of the titanium alloy (Ti-6Al-4V), the range in which the formation can be performed can be set to a range of 500 to 1,000° C.

The output adjuster 216 adjusts the output of the heater 205 such that the surface temperature of the plate W measured by the radiation thermometer 215 falls within a predetermined temperature range. With this, the output of the heater 205 is adjusted based on the actual temperature of the formation target portion U of the plate W, so that the temperature of the formation target portion U of the plate W can be adjusted more appropriately. In addition, the radiation thermometer 215 measures the surface temperature of the portion, with which the processing roller 31 contacts, of the plate W, that is, the surface temperature of a side (front surface side) of the plate W, the side being opposite to a side (rear surface side in the example of FIG. 9) where the heater 205 is located. Therefore, the radiation thermometer 215 can perform highly precise temperature measurement without being interfered by the heater 205.

When the surface temperature of the formation target portion U is a temperature in the range in which the formation can be performed (Yes in Step S4), the formation of the formation target portion U by processing is started by using the processing roller 31 (Step S5). In contrast, when the surface temperature of the formation target portion U is not a temperature in the range in which the formation can be performed (No in Step S4), the output of the heater 205 is adjusted until the surface temperature of the formation target portion U becomes a temperature in the range in which the formation can be performed.

The control device 200 causes the heater 205 to move in synchronization with the formation operation by the processing roller 31. It should be noted that the "synchronization" includes: a case where the heater 205 is moved to follow the movement of the processing roller 31; and a case where after the heating by the heater 205 is completed (after the surface temperature of the formation target portion U falls within the range in which the formation can be performed), the formation by the processing roller 31 is started (the processing roller is brought into contact with the formation target portion U of the plate W). With this, since the heater 205 moves in accordance with the formation operation by the processing roller 31, the formation can be stably performed. In addition, since the formation by the processing roller 31 can be performed after the heater 205 surely heats the formation target portion U, an excellent formed product can be obtained.

The control device 200 causes the processing roller 31 to move relative to the plate W at the feed speed corresponding to the load detected by the load measuring unit 213. Specifically, the control device 200 determines whether or not the load detected by the load measuring unit 213 falls within a preset range in which the formation can be performed (Step S6). When it is determined that the load falls within the range in which the formation can be performed (Yes in Step S6), the processing continues. When it is determined that the load does not fall within the range in which the formation can be performed (No in Step S6), the feed speed of the processing roller is changed (Step S7). The feed speed of the processing roller is repeatedly changed until the load falls within the range in which the formation can be performed.

In a case where the feed speed of the processing roller 31 with respect to the plate W when rotating the plate W is high, the formation speed becomes high, but the load becomes large, and this increases risks of cracks and deformations. In contrast, in a case where the feed speed is low, the load becomes small, but the formation speed becomes low. Therefore, by controlling the feed speed of the processing roller 31 such that the load falls within a predetermined range, the formation can be appropriately performed without decreasing the formation speed as much as possible.

Based on the information regarding the position of the formation target portion U of the plate W detected by the displacement sensor 214 and the information regarding the control of the position of the heater 205 obtained from the forming machine 30, the control device 200 determines whether or not a distance h between the heater 205 and the formation target portion U of the plate W falls within a predetermined range (for example, 1 to 10 mm) (Step S8). In a case where the distance h between the heater 205 and the formation target portion U falls within the predetermined range (Yes in Step S8), the processing continues. In a case where the distance h does not fall within the predetermined range (No in Step S8), the heater 205 is caused to move relative to the plate W such that the distance h becomes a predetermined distance (Step S9).

With this, even in a case where the plate W is displaced in a direction along the rotational axis O of the main shaft 20 at the time of the formation by processing, the distance between the heater 205 and the formation target portion U (heating target portion) of the plate W can be maintained constant. Especially in the case of the heater 205 using the coil 206 for high frequency induction heating as in the present embodiment, in a case where the distance h from the coil 206 to the formation target portion U of the plate W changes, the amount of heat applied from the coil 206 to the plate W changes relatively significantly. Therefore, by maintaining the distance h between the heater 205 and the formation target portion U of the plate W constant, the heating with respect to the formation target portion U of the plate W can be made constant at the time of the processing regardless of processing states.

While performing these control operations, the formation is performed. Then, the control device 200 determines for every predetermined formation timing whether or not the formation is completed (Step S10). When the formation is not completed yet (No in Step S10), the control device 200 continues a formation step (Steps S3 to S9). When the formation is completed (Yes in Step S10), the control device 200 terminates the process.

In the present embodiment, the position of the formation target portion U of the plate W can be recognized by the positional information from the displacement sensor 214. Therefore, based on this, the processing roller 31 and the heater 205 can be appropriately controlled, and the plate W can be formed into a desired shape with a high degree of accuracy. The magnitude of the load applied to the formation target portion U of the plate W can be recognized by the load information from the load measuring unit 213. Therefore, based on this, the accuracy of the formation of the plate W can be increased without using the mandrel.

Embodiment 8

Figure 12:
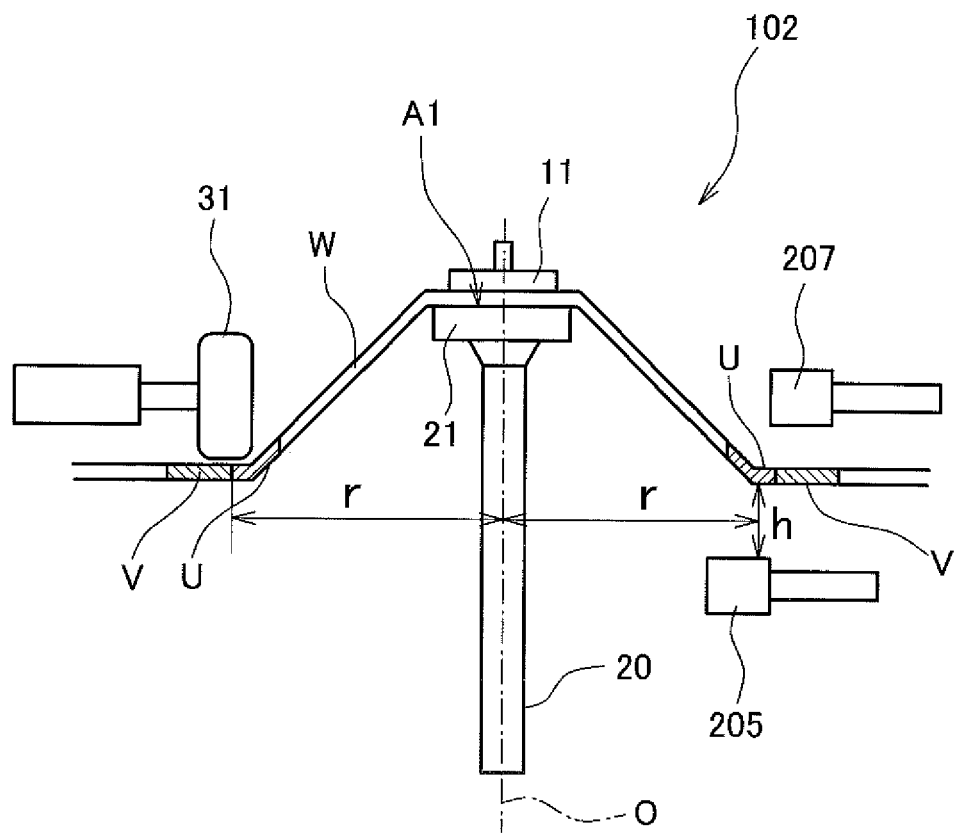
FIG. 12 is a schematic configuration diagram showing the spinning forming apparatus according to Embodiment 7 of the present invention.

Hereinafter, the spinning forming apparatus according to Embodiment 8 of the present invention will be explained. FIG. 12 is a schematic configuration diagram showing the spinning forming apparatus according to Embodiment 8 of the present invention. In the present embodiment, the same reference signs are used for the same components as in Embodiment 7, and a repetition of the same explanation is avoided. As shown in FIG. 12, a spinning forming apparatus 102 of the present embodiment is different from Embodiment 6 in that the spinning forming apparatus 102 further includes a preheater 207 configured to preliminarily heat a position of the plate W, the position being located at a radially outer side of the position (formation target portion U) with which the processing roller 31 contacts (i.e., the position being a position (preliminarily heated portion V) located at a not-yet-formed portion side of the plate W in a formation proceeding direction). In FIG. 12, the components, such as the control device 200 and the load measuring unit 213, which are related to the control operations are not shown.

Here, the formation proceeding direction is defined as a direction in which the formation of the plate W by the processing roller 31 proceeds. In the example of FIG. 12, the formation proceeding direction is a direction from a radially inner side of the rotational axis O to a radially outer side thereof. In this case, the preheater 207 is provided at a rotational axis O radially outer side of the heater 205.

In the present embodiment, the preheater 207 is configured to heat the position (preliminarily heated portion V) on the side of the plate W opposite to the side heated by the heater 205, the position being located on a circumference around the rotational axis O, the circumference being defined by a position located at the rotational axis O radially outer side of the position (formation target portion U), heated by the heater 205, of the plate W. To be specific, the preheater 207 preliminarily heats the not-yet-formed portion of the plate W. As with the heater 205, the preheater 207 adopts the heating by high frequency induction heating. However, the preheater 207 may adopts the heating by a burner or the like. The output of the preheater 207 is adjusted such that the temperature of the preliminarily heated portion B becomes a temperature at which the preliminarily heated portion B does not deform by influences of the pressing force applied from the processing tool 3 to the formation target portion U. For example, it is preferable that the preheater 207 perform the heating weaker than the heating performed by the heater 205. In order that the heating performance of the preheater 207 is made lower than the heating performance of the heater 205, the output of the preheater 207 may be made lower than the output of the heater 205, and in addition to this or instead of this, the distance between the preheater 207 whose output is set to be the same as the output of the heater 205 and the plate W may be set to be longer than the distance between the heater 205 and the plate W. In addition, it is preferable that the preliminarily heated portion V be adjacent to the formation target portion U.

The output of the preheater 207 is adjusted such that the temperature of the preliminarily heated portion V becomes a temperature at which the preliminarily heated portion V does not deform by influences of the pressing force applied from the processing roller 31 to the formation target portion U.

Since the preliminarily heated portion V that is the not-yet-formed portion is preliminarily heated by the preheater 207, the temperature increases quickly at the time of the local heating by the heater 205. With this, the processing speed can be increased, and even in a case where the plate W is thick, the heating up to the temperature required for the formation can be efficiently performed without decreasing the processing speed.

Figure 13:
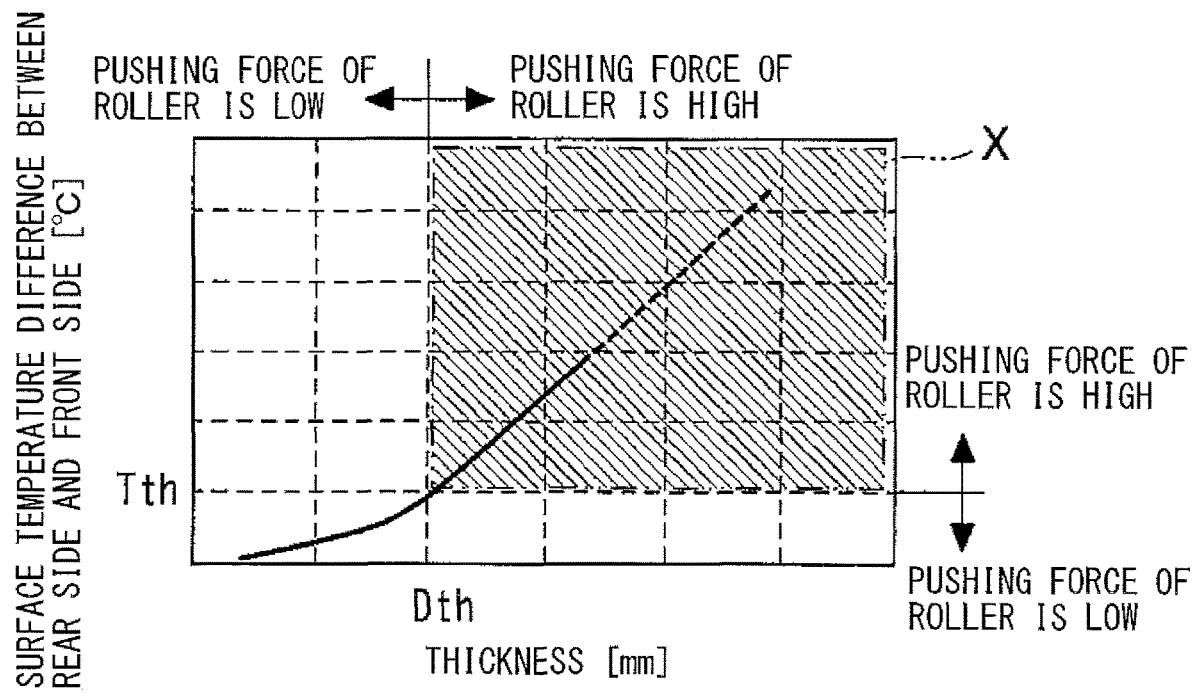
FIG. 13 is a graph showing a relationship between a thickness of the plate and a surface temperature difference between a rear side and front side of the plate.

The preliminary heating is suitably performed depending on the type and thickness of the plate W, the heating temperature, and the properties of the processing roller 31 (such as pushing force of the processing roller). Whether or not the preliminary heating is necessary can be considered especially depending on the thickness of the plate W, the surface temperature difference between the front and rear sides of the plate W, and the properties of the processing roller 31. FIG. 13 is a graph showing a relationship between the thickness of the plate and the surface temperature difference between the rear and front surfaces of the plate. FIG. 13 shows the temperature difference (rear surface temperature—front surface temperature) between the rear surface and the front surface when the temperature of the surface (rear surface), heated by the heater 205, of the plate W made of Ti-6Al-4V that is the titanium alloy is 900° C.

A region X shown by diagonal lines in FIG. 13 denotes a region where the use of the preliminary heating is effective (region where the thickness is not smaller than a thickness threshold Dth, and the surface temperature difference is not smaller than a surface temperature difference threshold Tth). The region X changes depending on the pushing force of the processing roller 31 that is one of the properties of the processing roller 31. To be specific, when the pushing force of the processing roller 31 increases, the thickness threshold Dth and the surface temperature difference threshold Tth become larger. When the pushing force of the processing roller 31 decreases, the thickness threshold Dth and the surface temperature difference threshold Tth become smaller. That is, when the pushing force of the processing roller 31 decreases, performing the preliminary heating is preferable even in the case of the smaller thickness or surface temperature difference.

The preheater 207 may be arranged in any manner as long as the preheater 207 can heat the position on the circumference around the rotational axis O, the circumference being defined by the position located at the rotational axis O radially outer side of the position, heated by the heater 205, of the plate W. For example, the preheater 207 may be arranged so as to heat a side of the plate W, the side being also heated by the heater 205. In the present embodiment, regarding the circumferential direction around the rotational axis O, the preheater 207 is arranged at the substantially same position as the heater 205. However, the preheater 207 and the heater 205 may be arranged at different positions in the circumferential direction.

Embodiment 9

Figure 14:
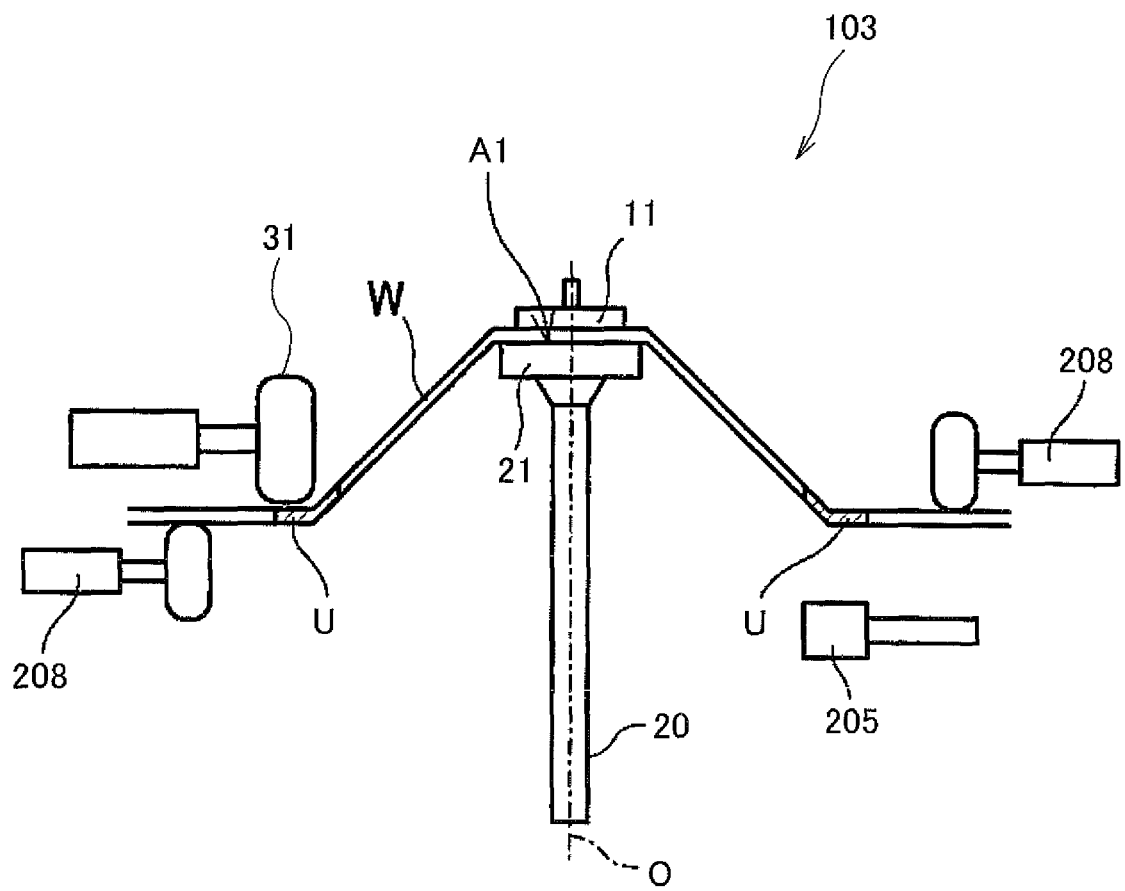
FIG. 14 is a schematic configuration diagram showing the spinning forming apparatus according to Embodiment 8 of the present invention.

Hereinafter, the spinning forming apparatus according to Embodiment 9 of the present invention will be explained. FIG. 14 is a schematic configuration diagram showing the spinning forming apparatus according to the present embodiment. As shown in FIG. 14, a spinning forming apparatus 103 of the present embodiment is different from Embodiment 7 in that the spinning forming apparatus 103 further includes an auxiliary tool 208 which contacts the not-yet-formed portion of the plate W and supports a position of the plate W, the position being located at the radially outer side of the position with which the processing roller 31 contacts. In FIG. 14, the components, such as the control device 200 and the load measuring unit 213, which are related to the control operations are not shown.

In the present embodiment, the auxiliary tool 208 is constituted by an auxiliary roller which is brought into contact with the not-yet-formed portion of the plate W to be rotated. However, the auxiliary tool 208 is not limited to the roller as long as the auxiliary tool 208 does not damage the plate W when contacting the plate W (the frictional force generated by the contact of the auxiliary tool 208 is small).

By using the auxiliary tool 208, the plate W can be stabilized and can be efficiently heated and processed. To be specific, since the not-yet-formed portion of the plate W is held by the auxiliary tool 208, deflections of an outer peripheral edge of the plate W in the direction along the rotational axis O generated when performing the processing by the processing roller 31 can be suppressed. With this, the heating by the heater 5 can become constant regardless of the formation target portion of the plate W. Further, the pressing force applied from the processing roller 31 to the plate W can become constant regardless of the formation target portion of the plate W. Therefore, the accuracy of the formation of the plate W can be increased.

The auxiliary tool 208 may be arranged in any manner as long as the auxiliary tool 208 contacts the not-yet-formed portion of the plate W. For example, as shown in FIG. 14, the auxiliary tool 208 may be provided at the side, with which the processing roller 31 contacts, of the plate W or may be provided at the opposite side. The number of auxiliary tools 208 may be one or plural.

The above embodiments are just examples, and the present invention is not limited to the embodiments. The present invention is shown by the scope of the claims, not the scope of the above explanations, and all the modifications within the meaning and scope equivalent to the scope of the claims may be made. For example, respective components in the above embodiments may be combined arbitrarily.

INDUSTRIAL APPLICABILITY

The present invention is useful for multistage forming of a plate.

REFERENCE SIGNS LIST

11 fixing jig, first fixing jig
14 second fixing jig
20 main shaft
21 receiving jig, first receiving jig
22 second receiving jig
23 protruding portion
25*a*, 25*b*, 25*c* edge portion
3 processing tool
41 first level-changing portion
51 second level-changing portion
100 to 103 spinning forming apparatus
200 control device
205 heater
W plate
S1 first main surface
S2 second main surface
A1 receiving surface, first receiving surface
A2 second receiving surface

The invention claimed is:
1. A spinning forming method comprising:
a first forming step of forming a first level-changing portion at a position between flat portions of a plate by, while rotating the plate fixed to a main shaft, causing a processing tool to contact a first main surface of the plate, the first level-changing portion extending from the first main surface toward a second main surface opposite to the first main surface, the flat portions being flat in a radial direction of the main shaft; and
a second forming step of forming a second level-changing portion by, while rotating the plate fixed to the main shaft, causing the processing tool to contact the second main surface of the plate at an outer peripheral side of the first level-changing portion, the second level-changing portion extending in an opposite direction to the first level-changing portion, wherein:

in the first forming step, a heater provided at an opposite side of the plate relative to the processing tool locally heats a position of the second main surface of the plate by induction heating, in the second forming step, the heater provided at the opposite side of the plate relative to the processing tool locally heats a position of the first main surface of the plate by induction heating, the first level-changing portion is fully formed at a position on the plate such that the first level-changing portion is not in contact with a first receiving jig, which is attached to the main shaft and on which the plate is placed before the first forming step, and the second level-changing portion is fully formed at a position on the plate such that the second level-changing portion is not in contact with a second receiving jig that replaces the first receiving jig after the first forming step and before the second forming step.

2. The spinning forming method according to claim 1, further comprising:
a preparing step before the first forming step; and
an intermediate step after the first forming step and before the second forming step, wherein:
in the preparing step, the plate is placed on the first receiving jig attached to the main shaft, and the plate is fixed to the main shaft via the first receiving jig by a fixing jig; and
in the intermediate step, the first receiving jig is replaced with the second receiving jig, which is larger than the first receiving jig and includes an annular protruding portion that supports a bottom portion of the first level-changing portion, the plate turned over is then placed on the second receiving jig, and the plate is fixed to the main shaft via the second receiving jig by the fixing jig.

3. The spinning forming method according to claim 2, wherein an edge portion that is pointed toward a predetermined radial position of the bottom portion of the first level-changing portion is formed at a tip end of the protruding portion of the second receiving jig.

4. The spinning forming method according to claim 3, wherein in the second forming step, the processing tool is brought into contact with the second main surface of the plate at a position immediately next to the edge portion of the second receiving jig.

5. The spinning forming method according to claim 1, further comprising:
a preparing step before the first forming step; and
an intermediate step after the first forming step and before the second forming step, wherein:
in the preparing step, the plate is placed on a first receiving jig attached to the main shaft, and the plate is fixed to the main shaft via the first receiving jig by a first fixing jig; and
in the intermediate step, the first receiving jig is replaced with a second receiving jig larger than the first receiving jig and including an annular protruding portion that supports a bottom portion of the first level-changing portion, the plate turned over is then placed on the second receiving jig, and the plate is fixed to the main shaft via the second receiving jig by a second fixing jig having a size that is not smaller than a minimum diameter of a portion where the protruding portion of the second receiving jig contacts the plate.

6. The spinning forming method according to claim 5, wherein when the plate turned over is placed on the second receiving jig, only the protruding portion of the second receiving jig receives the first main surface of the plate.

7. The spinning forming method according to claim 1, wherein:
in the first forming step, the position of the second main surface of the plate locally heated by the heater is located on a circumference defined by a position, with which the processing tool contacts, of the plate; and
in the second forming step, the position of the first main surface of the plate locally heated by the heater is located on the circumference defined by the position, with which the processing tool contacts, of the plate.

8. The spinning forming method according to claim 1, wherein multistage forming of the plate is realized by repeatedly performing the first forming step and the second forming step.

9. The spinning forming method according to claim 1, wherein:
in the first forming step, the first level-changing portion is formed at the same time as the induction heating by the heater; and
in the second forming step, the second level-changing portion is formed at the same time as the induction heating by the heater.

10. The spinning forming method according to claim 1, wherein:
the first level-changing portion extends from the first main surface toward the second main surface in a direction away from a rotational axis of the main shaft; and
the second level-changing portion extends from the second main surface toward the first main surface in the direction away from the rotational axis of the main shaft.

* * * * *